(12) United States Patent
Higashibeppu

(10) Patent No.: US 10,346,469 B2
(45) Date of Patent: Jul. 9, 2019

(54) DISPLAY INFORMATION GENERATING DEVICE, INFORMATION MANAGEMENT SYSTEM, DISPLAY INFORMATION GENERATING METHOD, AND RECORDING MEDIUM

(71) Applicant: CASIO COMPUTER CO., LTD., Shibuya-ku, Tokyo (JP)

(72) Inventor: Satoshi Higashibeppu, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 132 days.

(21) Appl. No.: 15/699,934

(22) Filed: Sep. 8, 2017

(65) Prior Publication Data
US 2018/0081909 A1    Mar. 22, 2018

(30) Foreign Application Priority Data
Sep. 16, 2016   (JP) ................. 2016-181380

(51) Int. Cl.
| | |
|---|---|
| *H04N 5/232* | (2006.01) |
| *H04N 5/247* | (2006.01) |
| *G06F 16/58* | (2019.01) |
| *G06F 16/51* | (2019.01) |
| *G11B 27/00* | (2006.01) |

(52) U.S. Cl.
CPC .......... *G06F 16/5866* (2019.01); *G06F 16/51* (2019.01); *G11B 27/00* (2013.01); *H04N 5/23206* (2013.01); *H04N 5/23222* (2013.01); *H04N 5/23293* (2013.01); *H04N 5/247* (2013.01)

(58) Field of Classification Search
CPC ..... G06F 16/5866; G06F 16/51; G11B 27/00; H04N 5/23222; H04N 5/23206; H04N 5/247; H04N 5/23293
See application file for complete search history.

(56) References Cited

U.S. PATENT DOCUMENTS

| | | | | |
|---|---|---|---|---|
| 6,166,735 | A * | 12/2000 | Dom .................. | G06F 16/743 715/749 |
| 8,438,484 | B2 * | 5/2013 | Gunatilake ...... | H04N 21/44008 715/720 |
| 8,526,778 | B2 * | 9/2013 | Lee .................. | H04N 5/232 386/224 |
| 10,199,072 | B2 * | 2/2019 | Yoshida ............... | G11B 27/034 |
| 2005/0111834 | A1 * | 5/2005 | Oka .................... | G11B 27/034 386/282 |
| 2007/0110169 | A1 * | 5/2007 | Nassor ............... | H04N 7/17318 375/240.26 |

FOREIGN PATENT DOCUMENTS

JP        2015130112 A     7/2015

* cited by examiner

*Primary Examiner* — Hung H Lam
(74) *Attorney, Agent, or Firm* — Holtz, Holtz & Volek PC

(57) ABSTRACT

When image information is transmitted from a first communication device, a server acquires a storyboard ID, a user ID, a photographing date/time, and the like contained in the image information. Furthermore, the server compares the storyboard ID and the user ID with the storyboard ID and the user ID in the storyboard information, specifies the registration destination of the image registration information corresponding to the image information, and registers them. Furthermore, the server generates a layout screen on which the images are displayed in chronological order based on the image registration information and the layout information.

22 Claims, 36 Drawing Sheets

FIG. 6

|   |   |   |
|---|---|---|
| × | CREATE STORY | CREATE — 611 |

TITLE
612 — FUJI-YOSHIDA CAMPING

ACTIVITY
613 — ◯

START
614 — AUGUST 30, 2016 10:00

END
615 — AUGUST 30, 2016 18:00

616 — INVITE FRIENDS

617 — DROP PIN ON MAP

618 — ☑ AUTOMATIC UPLOAD FROM EXTERNAL CAMERA

619 — PASSWORD  OPEN SESAME

| STORYBOARD ID |
| TITLE |
| START DATE/TIME |
| END DATE/TIME |
| POSITION |
| POSITION NAME |
| ENABLING/DISABLING OF AUTOMATIC UPLOAD FUNCTION |
| PASSWORD |
| CREATION USER ID |
| INVITED USER ID 1 |
| INVITED USER ID 2 |
| ⋮ |

FIG. 15

| | | | | |
|---|---|---|---|---|
| | STORYBOARD ID | | | |
| IMAGE ID 1 | PHOTOGRAPHING DATE/TIME | IMAGE ID 2 | PHOTOGRAPHING DATE/TIME | ..... |
| | TYPE | | TYPE | |
| | FACE DETECTION RESULT | | FACE DETECTION RESULT | |
| | NUMBER OF EVALUATIONS | | NUMBER OF EVALUATIONS | |
| | NUMBER OF COMMENTS | | NUMBER OF COMMENTS | |
| | COMMENT TEXT | | COMMENT TEXT | |
| | IMAGE DATA | | IMAGE DATA | |
| | PHOTOGRAPHING LOCATION | | PHOTOGRAPHING LOCATION | |

FIG. 16

| STORYBOARD ID | | |
|---|---|---|
| PERIOD 1<br>9:00AM<br>\|<br>10:00AM | IMAGE ID 1 | DISPLAY SIZE |
| | | DISPLAY POSITION |
| | IMAGE ID 2 | DISPLAY SIZE |
| | | DISPLAY POSITION |
| | ⋮ | |
| PERIOD 2<br>10:00AM<br>\|<br>11:00AM | IMAGE ID 3 | DISPLAY SIZE |
| | | DISPLAY POSITION |
| | IMAGE ID 4 | DISPLAY SIZE |
| | | DISPLAY POSITION |
| | ⋮ | |
| ⋮ | | |

FIG. 34

| | PHOTOGRAPHING DATE/TIME | | PHOTOGRAPHING DATE/TIME | |
|---|---|---|---|---|
| | TYPE | | TYPE | |
| | FACE DETECTION RESULT | | FACE DETECTION RESULT | |
| IMAGE ID 1 | NUMBER OF EVALUATIONS | IMAGE ID 2 | NUMBER OF EVALUATIONS | ..... |
| | NUMBER OF COMMENTS | | NUMBER OF COMMENTS | |
| | COMMENT TEXT | | COMMENT TEXT | |
| | IMAGE DATA | | IMAGE DATA | |
| | USER ID | | USER ID | |

With STORYBOARD ID as the top header spanning the entire table.

FIG. 36

| STORYBOARD ID | | | | |
|---|---|---|---|---|
| IMAGE ID 1 | PHOTOGRAPHING DATE/TIME | IMAGE ID 2 | PHOTOGRAPHING DATE/TIME | ..... |
| | TYPE | | TYPE | |
| | FACE DETECTION RESULT | | FACE DETECTION RESULT | |
| | NUMBER OF EVALUATIONS | | NUMBER OF EVALUATIONS | |
| | NUMBER OF COMMENTS | | NUMBER OF COMMENTS | |
| | COMMENT TEXT | | COMMENT TEXT | |
| | IMAGE DATA | | IMAGE DATA | |
| | SENSOR DATA | | SENSOR DATA | |

DISPLAY INFORMATION GENERATING DEVICE, INFORMATION MANAGEMENT SYSTEM, DISPLAY INFORMATION GENERATING METHOD, AND RECORDING MEDIUM

BACKGROUND OF THE INVENTION

Field of the Invention

The present invention relates to a display information generating device, an information management system, a display information generating method, and a recording medium.

DESCRIPTION OF THE INVENTION

Conventionally, various techniques for managing photographed images are used as disclosed in JP 2015-130112 A. For example, there is a technique for specifying an event participant based on the photographing date/time, photographing position, schedule information, and the face detection result of the photographed image, classifying and managing photographed images according to the information, and generating an electronic album.

SUMMARY OF THE INVENTION

A first aspect of the present invention is summarized as a display information generating device including: a data acquisition unit configured to acquire data transmitted from outside of the display information generating device; an information acquisition unit configured to acquire information on a generated date-and-time of the data acquired by the data acquisition unit; a sender specifying unit configured to specify a sender of the data acquired by the data acquisition unit; a first determination unit configured to determine whether or not the sender specified by the sender specifying unit belongs to a preset group; a control unit configured to, when the first determination unit determines that the sender belongs to the group, associate identification information for identifying the group with the data acquired by the data acquisition unit; and a generation unit configured to, if the identification information is associated with a plurality of pieces of data by the control unit, generate display information in which the plurality of pieces of data is arranged in a chronological order based on the generated date-and-time of the data acquired by the information acquisition unit.

A second aspect of the present invention is summarized as an information management system including: a display information generating device; and a display device, wherein the display information generating device includes: a data acquisition unit configured to acquire data transmitted from outside of the display information generating device; an information acquisition unit configured to acquire information on a generated date-and-time of the data acquired by the data acquisition unit; a sender specifying unit configured to specify a sender of the data acquired by the data acquisition unit; a first determination unit configured to determine whether or not the sender specified by the sender specifying unit belongs to a preset group; a control unit configured to, when the first determination unit determines that the sender belongs to the group, associate identification information for identifying the group with the data acquired by the data acquisition unit; a generation unit configured to, if the identification information is associated with a plurality of pieces of data by the control unit, generate display information in which the plurality of pieces of data is arranged in a chronological order based on the generated date-and-time of the data acquired by the information acquisition unit; and a transmission unit configured to transmit the display information generated by the generation unit to the display device; and the display device comprises: a reception unit configured to receive the display information transmitted from the transmission unit; and a display control unit configured to display the display information received by the reception unit.

A third aspect of the present invention is summarized as a display information generating method including: a data acquisition step of acquiring data transmitted from outside; an information acquisition step of acquiring information on a generated date-and-time of the data acquired in the data acquisition step; a sender specifying step of specifying a sender of the data acquired in the data acquisition step; a determination step of determining whether or not the sender specified in the sender specifying step belongs to a preset group; a control step of, when it is determined that the sender belongs to the group in the sender specifying step, associating identification information for identifying the group with the data acquired in the data acquisition step; and a generation step of, if the identification information is associated with a plurality of pieces of data in the control step, generating display information in which the plurality of pieces of data is arranged in a chronological order based on the generated date-and-time of the data acquired in the information acquisition step.

A fourth aspect of the present invention is summarized as a recording medium storing a computer readable program for causing a computer to function as: a data acquisition unit configured to acquire data transmitted from outside of the computer; an information acquisition unit configured to acquire information on a generated date-and-time of the data acquired by the data acquisition unit; a sender specifying unit configured to specify a sender of the data acquired by the data acquisition unit; a determination unit configured to determine whether or not the sender specified by the sender specifying unit belongs to a preset group; a control unit configured to, when the determination unit determines that the sender belongs to the group, associate identification information for identifying the group with the data acquired by the data acquisition unit; and a generation unit configured to, if the identification information is associated with a plurality of pieces of data by the control unit, generate display information in which the plurality of pieces of data is arranged in a chronological order based on the generated date-and-time of the data acquired by the information acquisition unit.

BRIEF DESCRIPTION OF THE INVENTION

FIG. 6 is a diagram showing an example of a new storyboard creating screen;

FIG. 8 is a diagram showing an example of storyboard information;

FIG. 15 is a diagram showing an example of image registration information;

FIG. 16 is a diagram showing an example of layout information;

FIG. 34 is a diagram showing an example of image registration information according to a modified example of an embodiment of the present invention;

FIG. 36 is a diagram showing an example of image registration information according to another modification of an embodiment of the present invention.

DETAILED DESCRIPTION OF THE PREFERRED EMBODIMENTS

Figure 1:
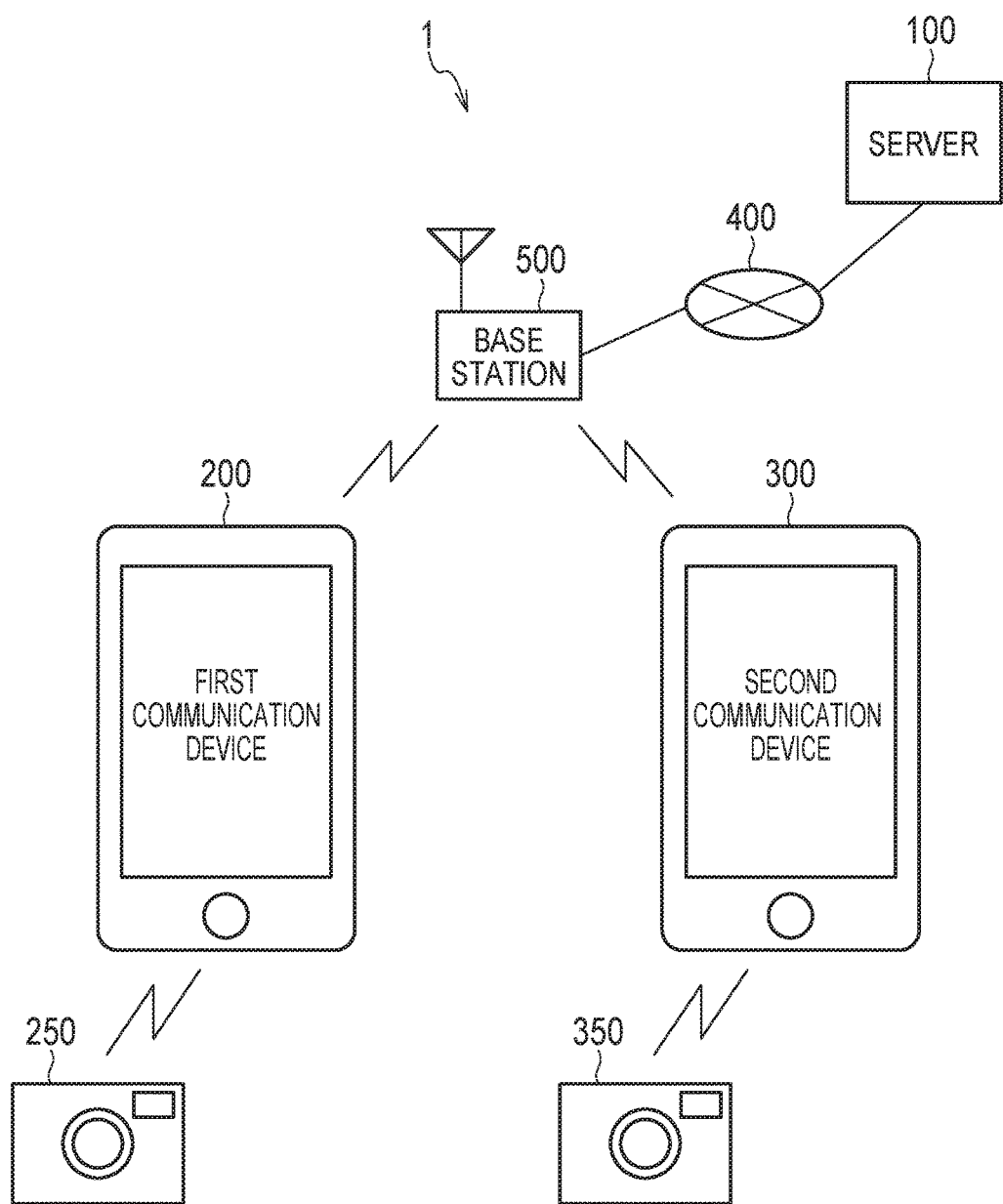
FIG. 1 is a diagram showing a configuration of an information management system according to an embodiment of the present invention.

Hereinafter, an information management system according to an embodiment of the present invention will be described. As shown in FIG. 1, an information management system 1 according to an embodiment of the present invention includes a server 100, a first communication device 200, digital cameras 250 and 350, a second communication device 300, an internet 400, and a base station 500.

In the information management system 1, the server 100 and each of the first communication device 200 and the second communication device 300 can communicate via the internet 400 and the base station 500.

The server 100 as a display information generating device generates, from image information transmitted from the first communication device 200 and the second communication device 300, display information for displaying images contained in the image information in chronological order for each event (hereinafter referred to as a storyboard). The server 100 updates the layout of a storyboard when an image is added to the storyboard or the like. The server 100 further transmits the storyboard according to a request from the first communication device 200 or the second communication device 300.

The first communication device 200 and the second communication device 300 as display devices are portable electronic devices such as smartphones or tablets. The first communication device 200 and the second communication device 300 perform, according to a user's operation, photographing, displaying a storyboard, creating a new storyboard, setting of participation in a storyboard, uploading information to register an image in a storyboard, and the like.

Figure 2:
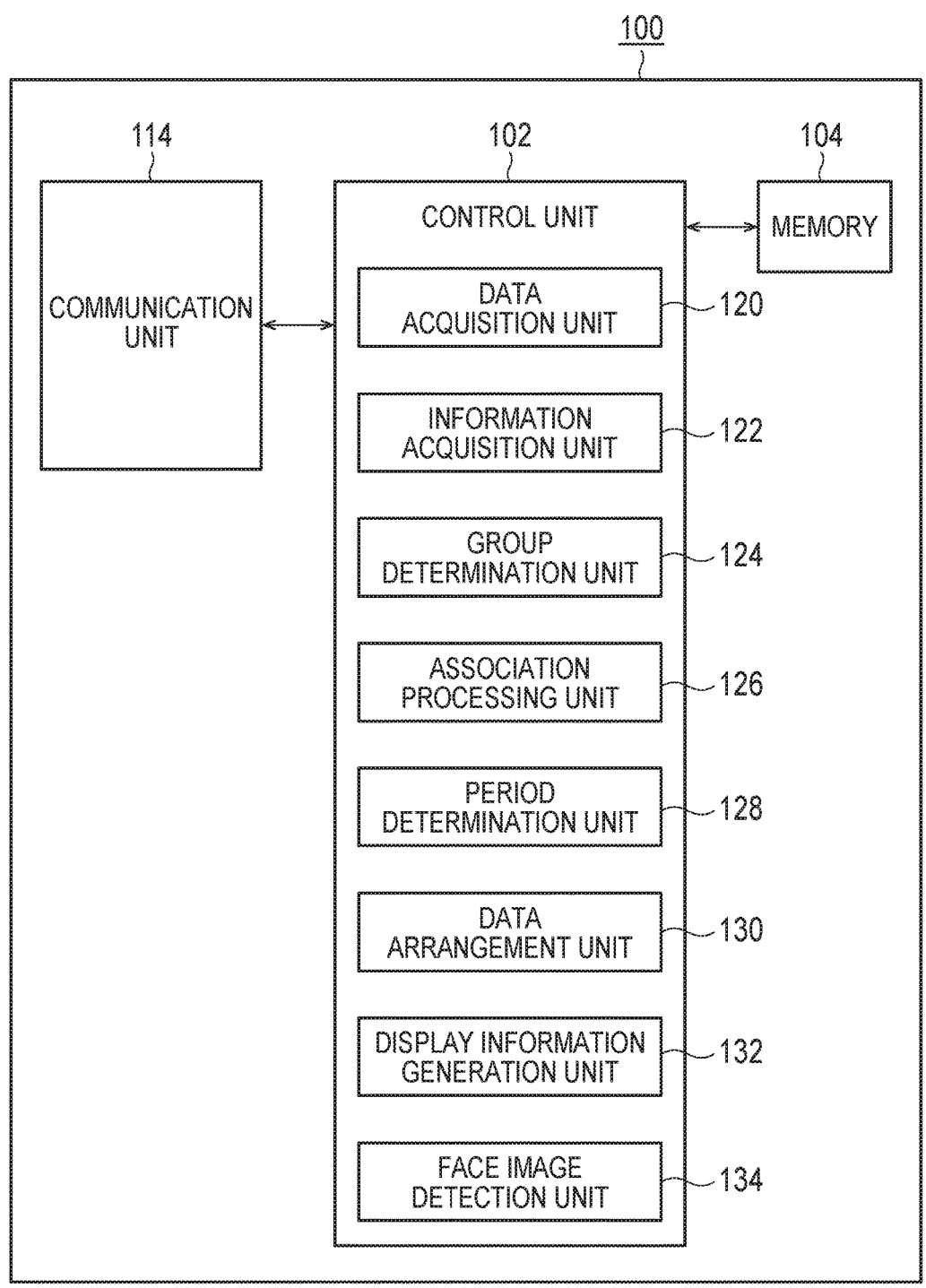
FIG. 2 is a diagram showing a configuration of a server shown in FIG. 1.

Next, the server 100 will be described. As shown in FIG. 2, the server 100 includes a control unit 102, a memory 104, and a communication unit 114.

The control unit 102 includes a central processing unit (CPU), performs software processing according to a program stored in the memory 104, and implements various functions of the server 100.

The memory 104 is, for example, a random access memory (RAM) serving as a work area, and a read only memory (ROM) storing basic operation programs. The memory 104 stores various information (programs and the like) used for control or the like in the server 100.

The communication unit 114 communicates with the first communication device 200 and the second communication device 300 via the internet 400 and the base station 500.

A data acquisition unit 120 in the control unit 102 acquires, from the communication unit 114, various types of information such as image information transmitted from the first communication device 200 and the second communication device 300, evaluation information indicating evaluation of an image displayed on a storyboard, comment information, composite comment information, and the like.

The image information includes image data in the Joint Photographic Experts Group (JPEG) format which is still image data, image data in the Moving Picture Experts Group (MPEG) format which is moving image data, a storyboard ID which is identification information of a storyboard in which an image is registered, information on a photographing date/time, an image type (a regular aspect ratio image, a dome view (super wide angle, fish-eye) image, a whole celestial sphere image, a panoramic image, a time lapse movie, and the like), a manufacturer code for identifying the model of the photographing camera (the manufacturer code of first communication device 200 or the second communication device 300 if the image is photographed by a photographing unit 214 of the first communication device 200 or the second communication device 300), photographing location information indicating the photographing location (the latitude, the longitude, and the altitude), and the like.

An information acquisition unit 122 in the control unit 102 acquires the information on the photographing date/time contained in the image information. A group determination unit 124 in the control unit 102 determines, based on a user ID with which a user has logged in when the image information is transmitted, whether or not the user who is the sender of the image information is a participant in a predetermined storyboard.

When the user who is the sender of the image information is the participant in the predetermined storyboard, an association processing unit 126 in the control unit 102 associates the storyboard ID which is the identification information of the storyboard with the image information.

A period determination unit 128 in the control unit 102 determines whether or not the photographing date/time is within a period from the start date/time to the end date/time of the event corresponding to the predetermined storyboard based on the photographing date/time information contained in the image information.

A data arrangement unit 130 in the control unit 102 divides the period from the start date/time to the end date/time of the storyboard for each predetermined unit time (for example, every hour). Furthermore, the data arrangement unit 130 determines, for each divided unit time, whether or not the photographing date/time is within the corresponding unit time based on the photographing date/time information contained in the image information.

A display information generation unit 132 in the control unit 102 generates the storyboard in which images the photographing dates/times of which are within the corresponding unit time are arranged in chronological order.

A face image detection unit 134 in the control unit 102 analyzes the image data contained in the image information to recognize a face with an existing method, and determines whether or not a face image is detected.

The display information generation unit 132 updates the layout of the storyboard so that the image in which the face image is detected and the image having a high evaluation indicated by the evaluation information and the comment information are noticeable in the storyboard.

Figure 3:
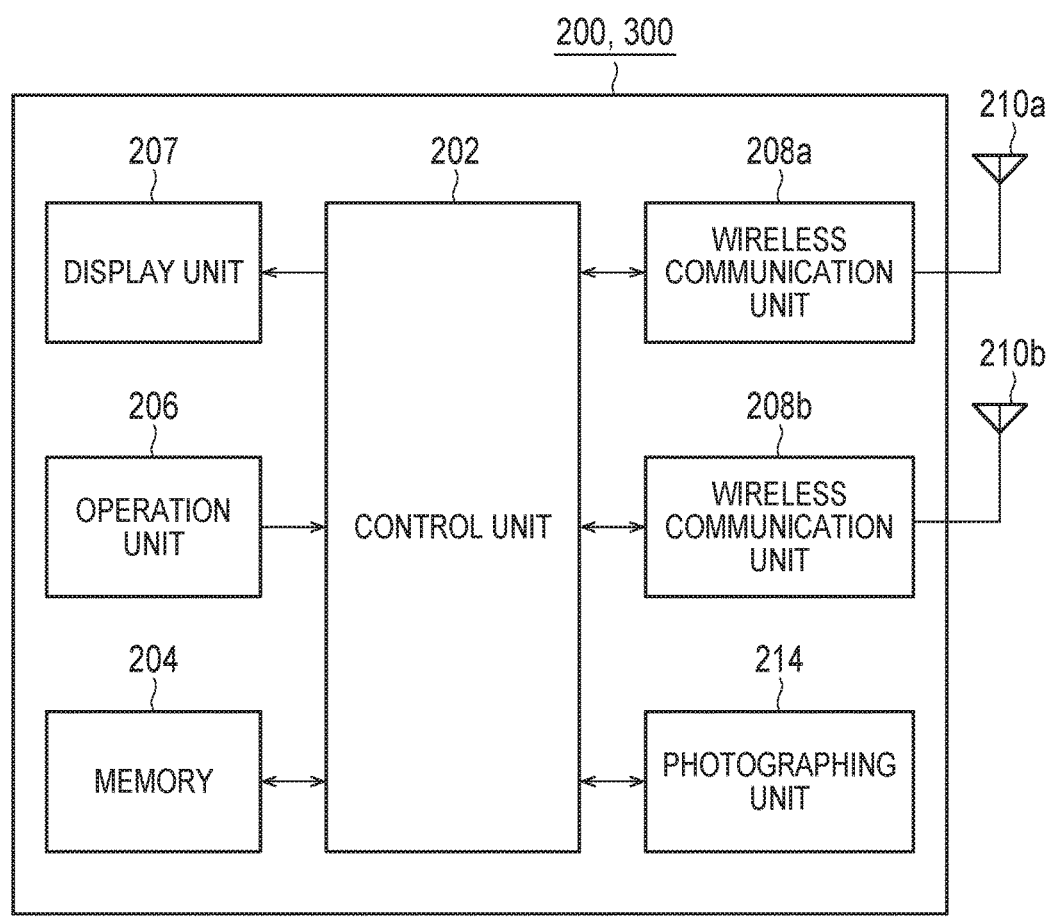
FIG. 3 is a diagram showing a configuration of a first communication device and a second communication device shown in FIG. 1.

Next, the first communication device 200 and the second communication device 300 will be described. As shown in FIG. 3, the first communication device 200 and the second communication device 300 each include a control unit 202, a memory 204, an operation unit 206, a display unit 207, wireless communication units 208a and 208b, antennas 210a and 201b, and a photographing unit 214.

The control unit 202 is constituted by a CPU. The control unit 202 functions to implement various functions of the first communication device 200 and the second communication device 300 by performing software processing according to a program stored in the memory 204.

The memory 204 is, for example, a RAM or a ROM. The memory 204 stores various kinds of information (programs and the like) used for control and the like in the first communication device 200 and the second communication device 300.

The operation unit 206 is a touch panel disposed on the upper surface of the display area of the display unit 207, and is an interface used for detecting a user's operation content (tapping and double taping to a certain position of the display unit 207, scrolling, and pinching in/out) and for recognizing the detection result as a predetermined command, and input or selection of data. The display unit 207 is constituted by, for example, a liquid crystal display (LCD), a plasma display panel (PDP), an electro luminescence (EL) display, and the like, and displays an image.

The wireless communication units 208a and 208b are constituted by, for example, a radio frequency (RF) circuit, a base band (BB) circuit, or the like. The wireless communication unit 208a transmits and receives a wireless signal to and from the base station 500 via the antenna 210a. The wireless communication unit 208b receives a wireless signal from the digital camera 250 (the digital camera 350 in the case of the second communication device) via the antenna 210b. Furthermore, the wireless communication units 208a and 208b modulate a transmission signal and demodulate a reception signal.

The photographing unit 214 is disposed on a surface of the housing which is opposite to the surface on which the display unit 207 is installed. The photographing unit 214 includes a lens and a light receiving element. The lens is constituted by a zoom lens or the like, and moves by zoom control and focus control by the control unit 202. The photographing view angle and the optical image of the photographing unit 214 are controlled by movement of the lens. The light receiving element is constituted by a plurality of light receiving elements arranged regularly two-dimensionally on the light receiving surface. The light receiving element is, for example, a photographing device having a photodiode, or a Bayer array color filter, or a photographing device such as a three-chip charge coupled device (CCD), complementary metal oxide semiconductor (CMOS), or the like.

Next, operations of the server 100, the first communication device 200, and the second communication device 300 will be described. The following description exemplifies the case in which the user of the first communication device 200 is the organizer of a predetermined event and is the creator of a storyboard showing the progress status of the predetermined event, and the user of the second communication device 300 is a participant of the event and uploads or evaluates information on the image photographed by the user to the storyboard.

Figure 4:
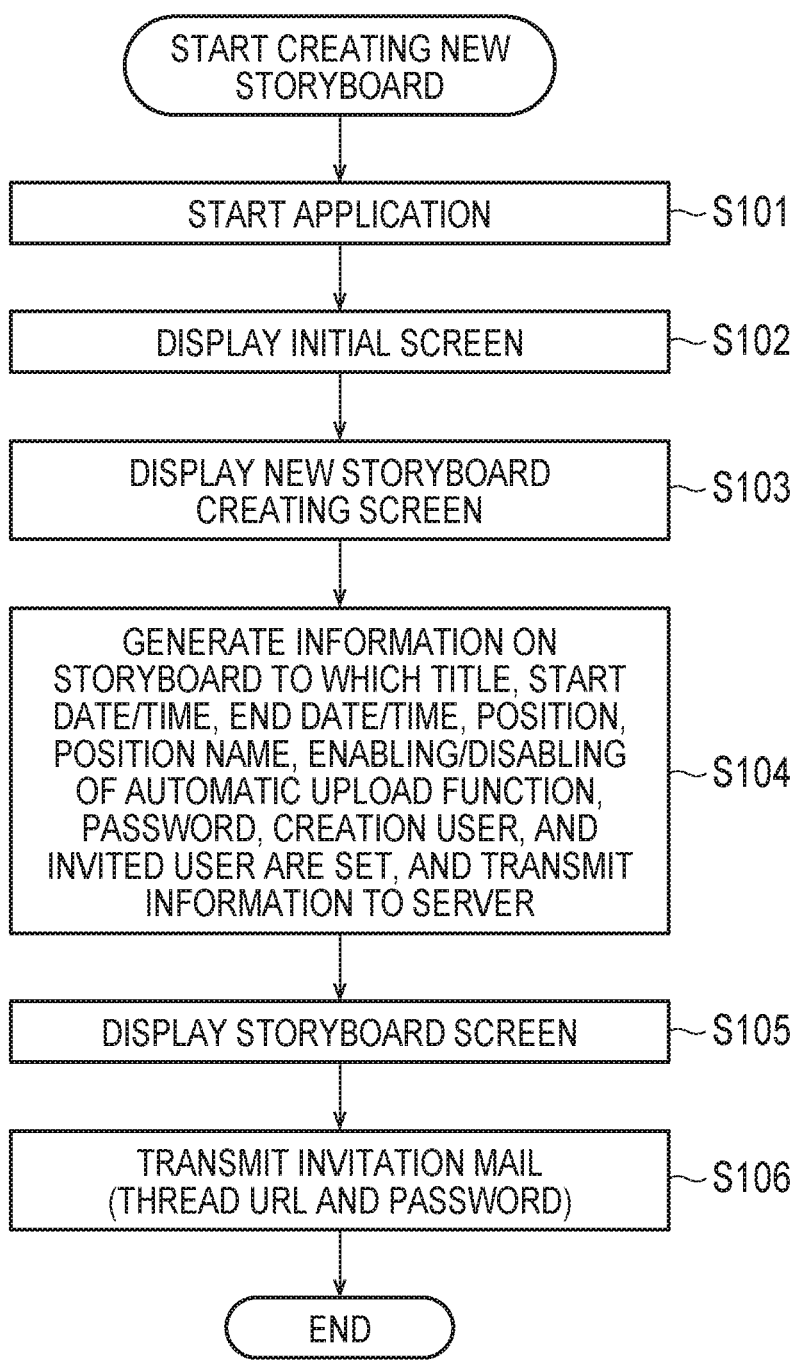
FIG. 4 is a flowchart showing an operation of creating a new storyboard in the first communication device.

FIG. 4 is a flowchart showing an operation of creating a new storyboard in the first communication device 200. The control unit 202 in the first communication device 200 starts an application program (application) for a storyboard according to a predetermined operation to the operation unit 206 by the user (step S101). The application program for a storyboard is an application program for creating, updating, and displaying a storyboard.

Next, the control unit 202 performs the control to display an initial screen on the display unit 207 according to a predetermined operation to the operation unit 206 by the user (step S102).

Figure 5:
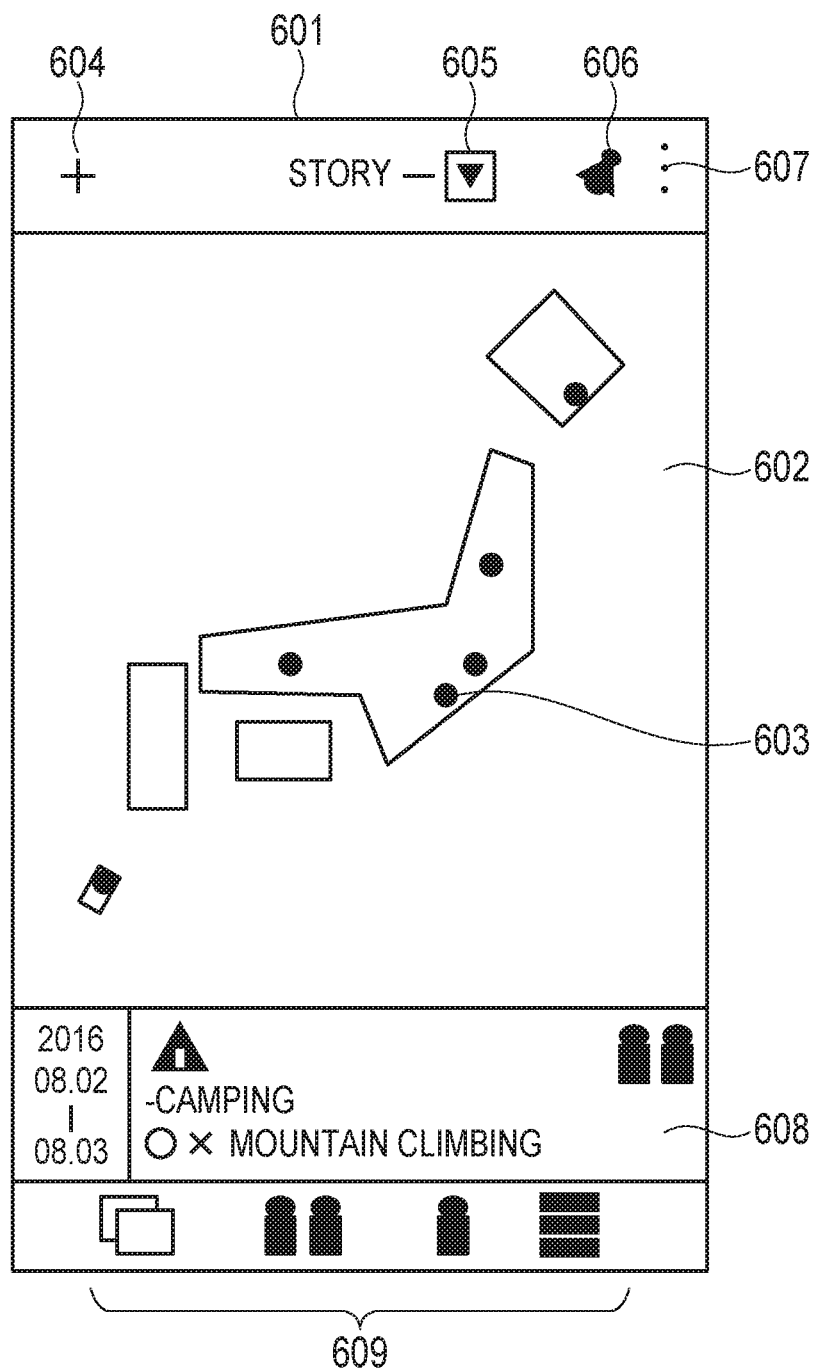
FIG. 5 is a diagram showing an example of an initial screen.

FIG. 5 is a diagram showing an example of the initial screen. A storyboard list screen 601 shown in FIG. 5 includes a map image 602, a mark 603 indicating an occurrence position of an event which has been held in the past and the storyboard thereof is recorded, a new storyboard creating button icon 604, a display filter setting icon 605, a notification icon 606, a function setting menu icon 607, an activity log 608, and a menu icon group 609. In the storyboard list screen, the map image 602 is transmitted from the network service with which the first communication device 200 is being connected, and the first communication device 200 is connected to a map search site of the network service when the selection of the map image 602 is detected. When the selection of the mark 603 is detected, the display can be switched to the display of the storyboard in which the mark 603 is registered as the position information on the place where the event is held. The display filter setting icon 605 is an icon for selecting the activity (the types of the storyboard (event)) to be displayed in the activity log 608. When the selection of the display filter setting icon 605 is detected, the types of activity is displayed in a list. The types of activity include, for example, "personal event", "traveling", "hiking", "snorkeling", "skiing", "camping", and the like. When any one of these is detected, a storyboard to which the type of activity is set is displayed in the activity log 608 (further displayed additionally when the downward scroll is detected). The notification icon 606 is an icon for notifying the user that there is various types of information or update is available, and the display is switched to a list of the information when the selection of the notification icon 606 is detected. The function setting menu icon 607 is an icon for displaying various setting menus of the application program, and items such as "create new story", "delete story", "auto upload designation", "select shared story" and "register account" are displayed in balloons in a list when the selection of the function setting menu icon 607 is detected. When the selection of "auto upload designation" is detected, a list of created storyboards is displayed. Then, a setting screen for indicating (permitting) that the images of the storyboards photographed by the digital camera 250 (or the digital camera 350) during the event period are automatically uploaded (transmitted or transferred) to the server 100 via the first communication device 200 (or the second communication device 300) is displayed. When the selection of the "select shared story" is detected, a list of created storyboards (including end events) is displayed. Then, a setting screen for setting (permitting) the third person's browsing (sharing) in the storyboards is displayed.

While the storyboard list screen 601 of FIG. 5 is being displayed, the user of the first communication device 200 operates the operation unit 206 and selects the new storyboard creating button icon 604 in the storyboard list screen 601 to create a new storyboard. The control unit 202 performs the control to display a new storyboard creating screen on the display unit 207 according to the operation of selecting the new storyboard creating button icon 604 (step S103).

FIG. 6 is a diagram showing an example of the new storyboard creating screen. A new storyboard creating screen 610 shown in FIG. 6 includes a creation button icon 611, a title input field 612 for inputting a title corresponding to the storyboard, an activity input field 613 for inputting an activity corresponding to the event, a start date/time input field 614 for inputting the start date/time of the event, an end date/time input field 615 for inputting the end date/time of the event, a friend invitation button icon 616 to be selected to invite other users such as the user of the second communication device 300 to the storyboard, a pin button icon 617 for setting a position corresponding to the storyboard on the map image, a selection field 618 to select enabling/disabling of the automatic upload function, and a password input field 619 for inputting a password among users.

While the new storyboard creating screen 610 is being displayed, the user of the first communication device 200 operates the operation unit 206 and performs the input to the title input field 612, the activity input field 613, the start date/time input field 614, the end date/time input field 615, and the password input field 619. The password can be set optionally. The control unit 202 acquires the input information.

The user of the first communication device 200 operates the operation unit 206 and selects the friend invitation button icon 616. The control unit 202 performs the control to display a user-to-be-invited selecting screen on the display unit 207 according to the operation of selecting the friend invitation button icon 616.

Figure 7:
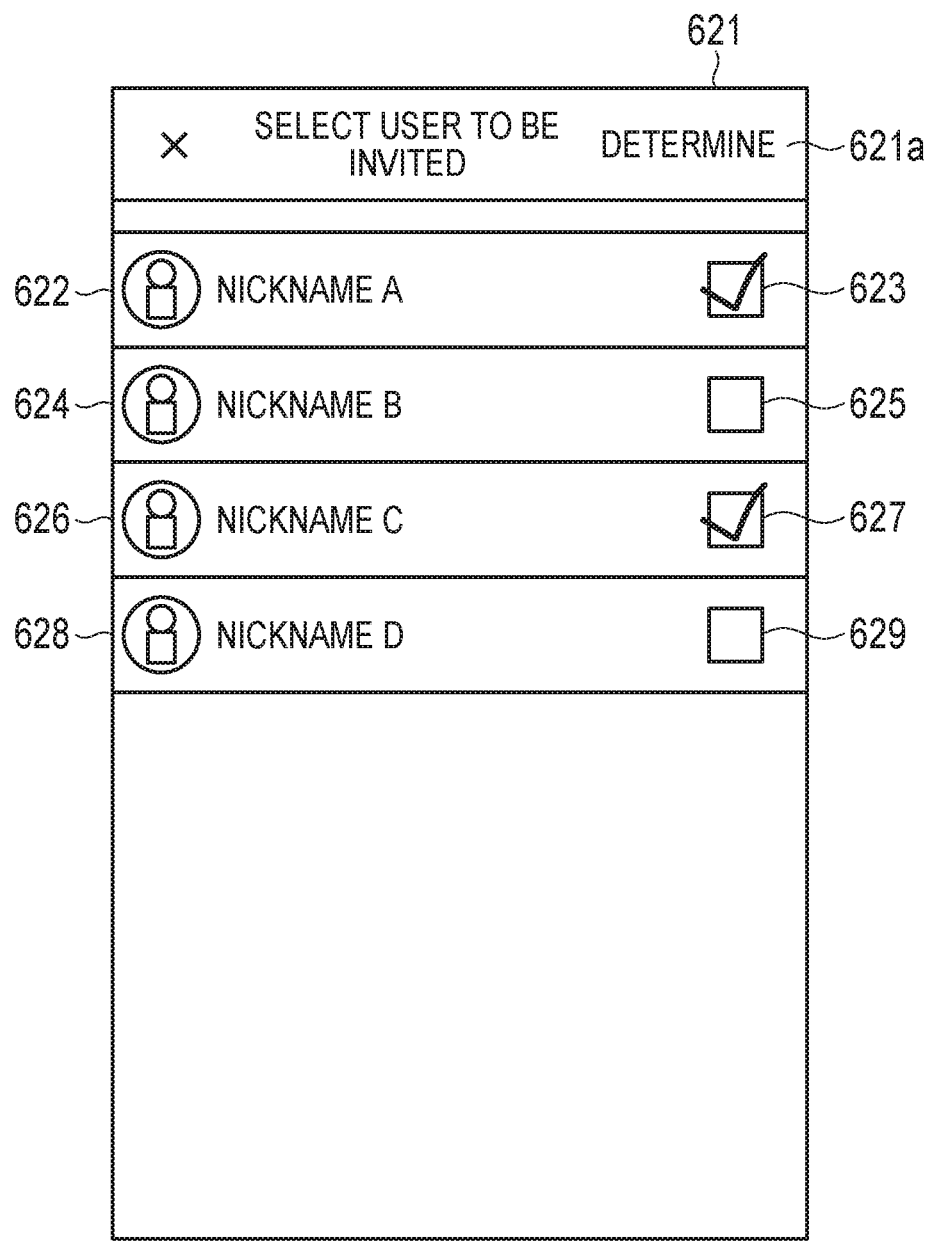
FIG. 7 is a diagram showing an example of a user-to-be-invited selecting screen.

FIG. 7 is a diagram showing an example of the user-to-be-invited selecting screen. A user-to-be-invited selecting screen 621 shown in FIG. 7 includes a determination button icon 621a, user display fields 622, 624, 626, and 628, and user selection fields 623, 625, 627, and 629. Other users displayed in the user display field 622 and the like are, for example, other users who have been registered by predetermined registration processing in the first communication device 200. The user of the first communication device 200 operates the operation unit 206, inputs check marks in the user selection field 623 and the like corresponding to other users desired to be invited to the storyboard, and selects the determination button icon 621a. The selection of other users is completed by selecting the determination button icon 621a, and the control unit 202 acquires the selection result.

The user of the first communication device 200 operates the operation unit 206 and selects the pin button icon 617. The control unit 202 performs the control to display the map image on the display unit 207 according to the operation of selecting the pin button icon 617. Furthermore, the user of the first communication device 200 operates the operation unit 206 and selects the position corresponding to the storyboard on the map image. The control unit 202 acquires the position (longitude and latitude) corresponding to the storyboard and the name of the position according to the selection operation.

When the enabling of the automatic upload function from the digital camera 250 (the digital camera 350 in the case of the user of the second communication device 300) is selected, the user of the first communication device 200 operates the operation unit 206 and inputs a check mark in the selection field 618. When the check mark is input, the link between the first communication device 200 and the digital camera 250 is established by the close proximity wireless communication technology such as Bluetooth (registered trademark). Then, when photographing processing is performed by the digital camera 250, the photographed image information is automatically transferred (uploaded) to the first communication device 200, and the image information is uploaded to the server 100.

When the user of the first communication device 200 operates the operation unit 206 and selects the creation button icon 611 in the new storyboard creating screen 610 shown in FIG. 6, the operation of creating the new storyboard is completed.

The description is returned back to FIG. 4. When the operation of creating the new storyboard is completed, the control unit 202 generates the information on the storyboard to which the title, the start date/time, the end date/time, the position, the position name, the enabling/disabling of the automatic upload function, the password, the creation user, and the users to be invited are set. The control unit 202 transmits the storyboard information to the server 100 (step S104).

FIG. 8 is a diagram showing an example of the storyboard information. The storyboard information shown in FIG. 8 includes a storyboard ID, a title, a start date/time, an end date/time, a position, a position name, enabling/disabling of automatic upload function, a password, a creation user ID, and an invited user ID.

The storyboard ID is identification information on the corresponding storyboard. For example, when the user of the first communication device 200 selects the creation button icon 611 in the new storyboard creating screen 610 shown in FIG. 6 and the operation of creating the new storyboard is completed, the control unit 202 transmits the information for requesting the storyboard ID to the server 100. The control unit 102 in the server 100 transmits the storyboard ID to the first communication device 200 in response to the request. The control unit 202 in the first communication device 200 acquires the storyboard ID from the server 100. The creation user ID is imparted from the server 100 when, for example, the first communication device 200 downloads the application program for the storyboard and performs predetermined setting processing. The invited user ID is, for example, an ID of another user registered beforehand by the predetermined registration processing in the first communication device 200 and also selected in the user-to-be-invited selecting screen of FIG. 7. The title, the start date/time, the end date/time, the position, the position name, the enabling/disabling of the automatic upload function, and the password are the information acquired by the control unit 202 according to the operation by the user of the first communication device 200 as described above.

The control unit 102 in the server 100 stores the storyboard information from the first communication device 200 in the memory 104.

The description is returned back to FIG. 4. Next, the control unit 202 performs the control to display the storyboard screen on the display unit 207 (step S105).

Figure 9:
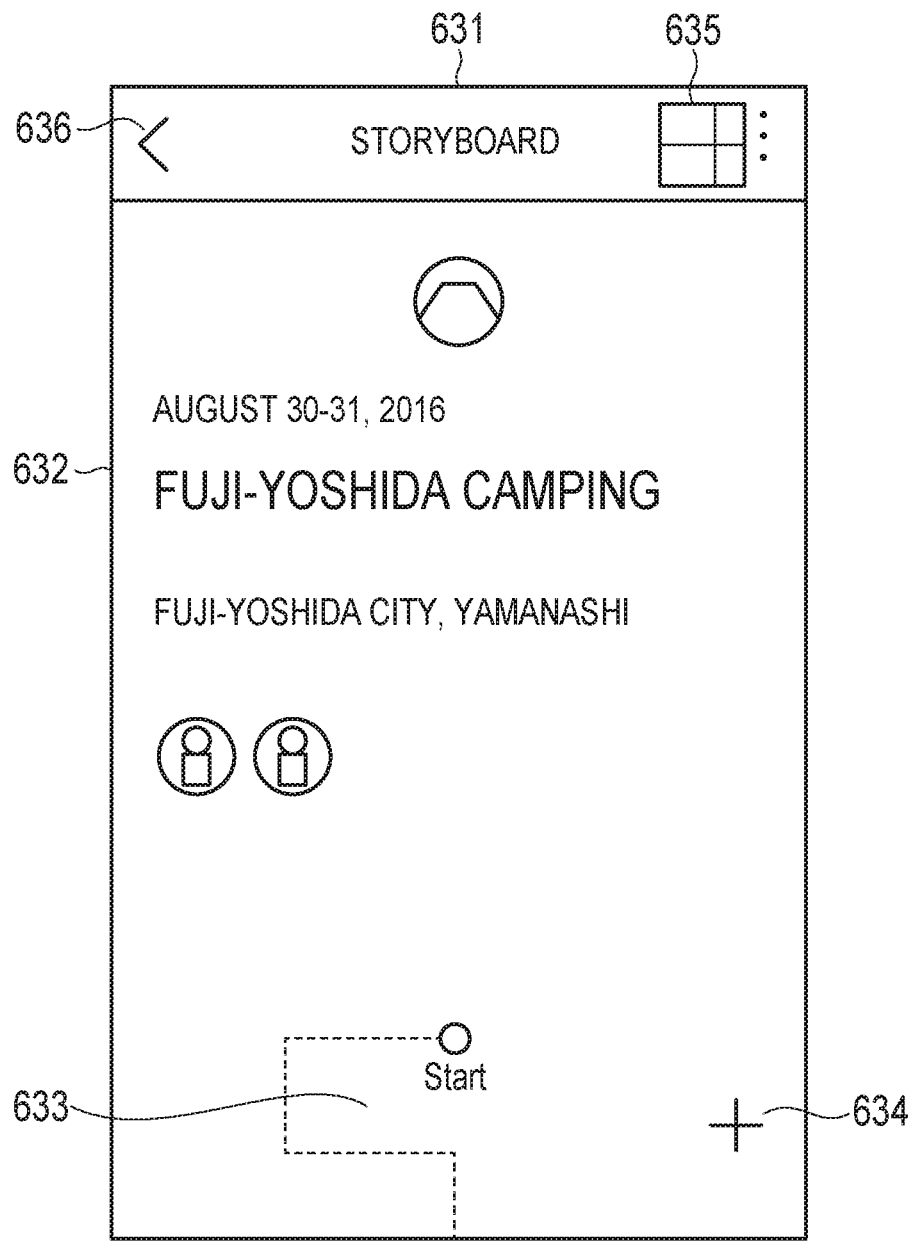
FIG. 9 is a diagram showing an example of a storyboard screen.

FIG. 9 is a diagram showing an example of the storyboard screen. A storyboard screen 631 shown in FIG. 9 includes a storyboard information display field 632, a scroll button icon 633, an upload button icon 634, an album screen switching button icon 635, and a storyboard list screen switching button icon 636. The storyboard information display field 632 includes the information on the activity, the period from the start date/time to the end date/time, the title, the position name, and the invited user. The scroll button icon 633 and the upload button icon 634 will be described later.

The description is returned back to FIG. 4. When a user desired to be invited is not included in the user-to-be-invited selecting screen 621 shown in FIG. 7, the user of the first communication device 200 can create an e-mail (invitation mail) containing a thread uniform resource locator (URL) which is the URL corresponding to the storyboard, and the password. The thread URL corresponds to the storyboard ID on a one-to-one basis. The control unit 202 performs the control to transmit the created invitation mail to the user desired to be invited (step S106). When the first communication device 200 transmits the invitation mail, in addition to the method for directly transmitting the invitation mail to the second communication device 300, it is also possible to request the server 100 to perform invitation processing. In this case, the server 100 which has received the request transmits an invitation notification to the second communication device 300 of the invitation target user.

Figure 10:
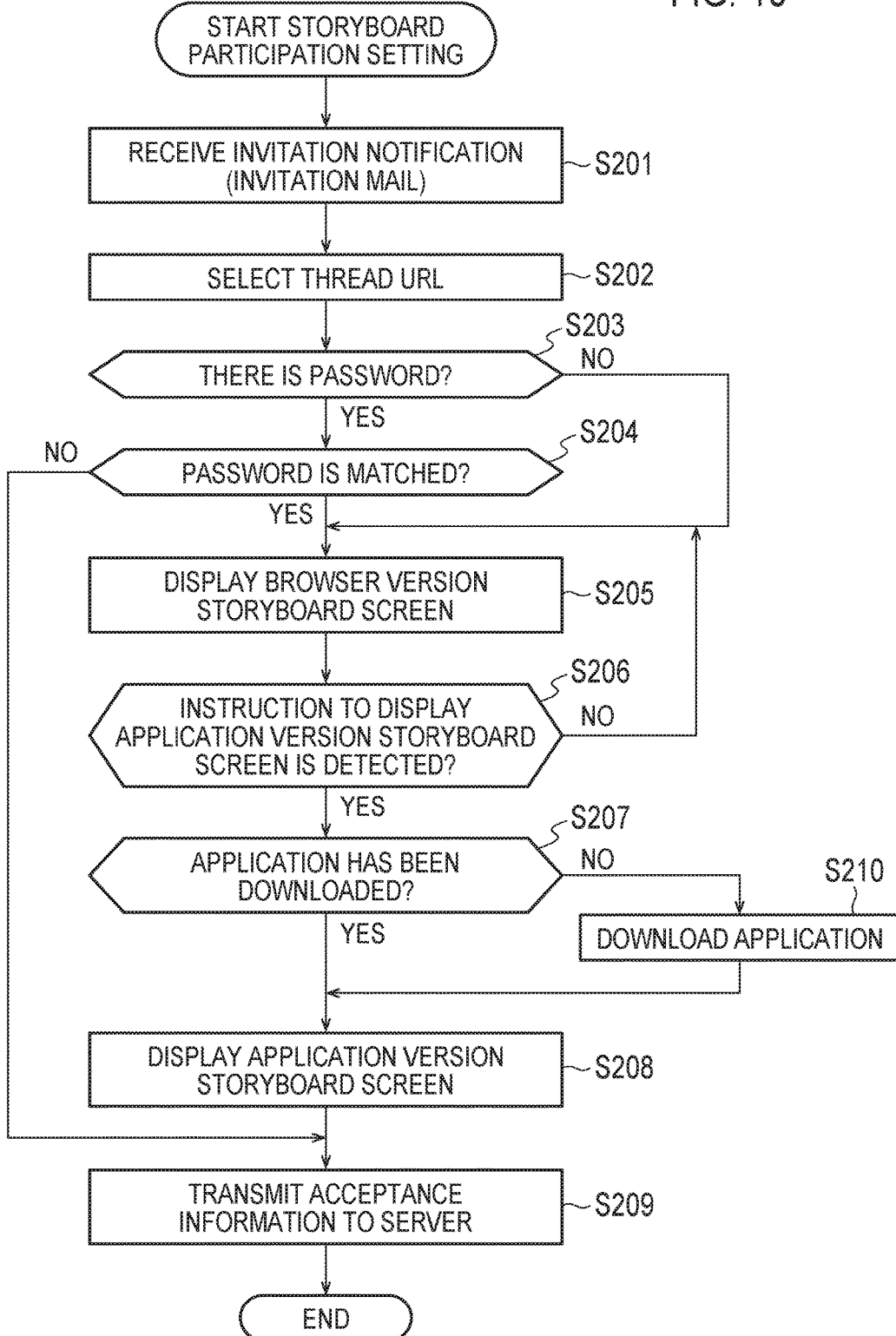
FIG. 10 is a flowchart showing an operation of storyboard participation setting in the second communication device.

Next, an operation of the storyboard participation setting in the second communication device 300 will be described. FIG. 10 is a flowchart showing the operation of storyboard participation setting in the second communication device 300. The control unit 202 in the second communication device 300 receives an invitation mail (step S201). Specifically, the control unit 202 receives the invitation mail transmitted by the first communication device 200 in step S106. The invitation mail contains a thread URL, a password, and the like.

Next, the control unit 202 performs the control to select the thread URL contained in the invitation mail according to the operation to the operation unit 206 by the user (step S202). Furthermore, the control unit 202 determines whether or not there is a password (step S203). Since the password setting is optional, a password cannot be contained in the invitation notification. When there is a password (step S203; YES), the control unit 202 determines whether or not the password input by the operation to the operation unit 206 by the user matches the set password (step S204). For example, the control unit 202 transmits the input password to the server 100. The control unit 102 in the server 100 determines whether or not the password matches the password set when the storyboard is newly created, and transmits the determination result to the second communication device 300. The control unit 202 can determine whether or not the passwords match each other based on the determination result.

If the passwords do not match each other (step S204; NO), the series of operations is completed. On the other hand, when the passwords match each other (step S204; YES) or when there is no password (step S203; NO), the control unit 202 performs the control to display a browser version storyboard screen corresponding to the thread URL on the display unit 207 (step S205). The browser version storyboard screen can be displayed if the storyboard application program is not downloaded.

Thereafter, the control unit 202 determines whether or not an instruction to display an application program version storyboard screen is detected (step S206). Specifically, an item "open with application" is displayed on a part of the browser version storyboard screen, and the control unit 202 perform the determination by detecting the selection of the item. When the selection is not detected (step S206; NO), the processing returns to step S205. On the other hand, when the selection is detected (step S206; YES), the control unit 202 determines whether or not the application program for the storyboard has been downloaded (step S207). When the application program for the storyboard has been downloaded (step S207; YES), the control unit 202 starts the application program for the storyboard and performs the control to display the storyboard screen on the display unit 207 (step S208). Thereafter, according to the operation to the operation unit 206 by the user, the control unit 202 transmits, to the server 100, acceptance information which is information indicating that the invitation is accepted (step S209).

The acceptance information contains an invited user ID which is the ID of the user of the second communication device 300. When receiving the acceptance information, the control unit 102 in the server 100 specifies, among the storyboard information stored in the memory 104, the storyboard information containing the storyboard ID corresponding to the thread URL selected in step S202 by the second communication device 300. Furthermore, the control unit 102 in the server 100 sets a participation flag "1" indicating participation to the invited user ID which matches the user ID contained in the acceptance information among the invited user IDs contained in the specified storyboard information. Thus, the processing necessary for the user of the second communication device 300 corresponding to the invited user ID to participate in the storyboard is completed.

On the other hand, when the application program for the storyboard has not been downloaded (step S207; NO), the control unit 202 switches the connection to the download site (URL) of the application program for the storyboard, and performs the control to download the application program for the storyboard according to the operation to the operation unit 206 by the user (step S210). Thereafter, the control unit 202 starts the application program for the storyboard, and performs the control to display the storyboard screen on the display unit 207 (step S208).

Figure 11:
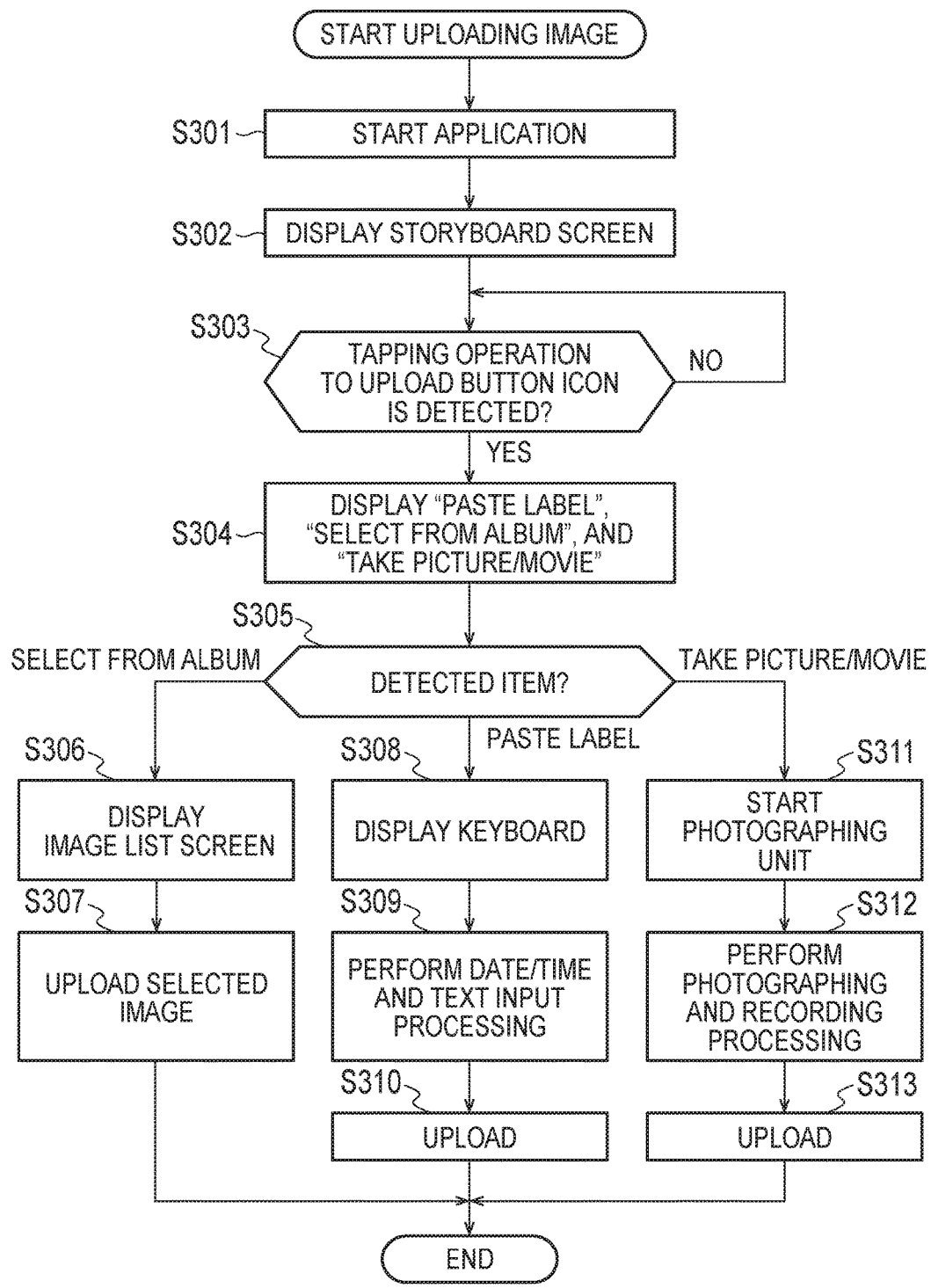
FIG. 11 is a flowchart showing an operation of uploading image information from a list in the first communication device.

Next, an operation of uploading image information in the first communication device 200 will be described. FIG. 11 is a flowchart showing the operation of uploading image information from a list in the first communication device 200. Note that, the upload operation in the first communication device 200 will be described in this flowchart, but a similar operation can be performed in the second communication device 300.

The control unit 202 in the first communication device 200 starts the application program (application) for the storyboard according to a predetermined operation to the operation unit 206 by the user (step S301). Next, the control unit 202 performs the control to display the storyboard screen on the display unit 207 according to a predetermined operation to the operation unit 206 by the user (step S302).

While the storyboard screen 631 shown in FIG. 9 is being displayed, the user of the first communication device 200 operates the operation unit 206 and selects the upload button icon 634 to upload an image stored in the first communication device 200. The control unit 202 determines whether or not the upload button icon 634 is selected in association with the operation (step S303). When the selection of the upload button icon 634 is not detected (step S303; NO), the processing in step S303 is repeated. On the other hand, when the selection of the upload button icon 634 is detected (step S303; YES), the control unit 202 performs the control to display the items of "paste label", "select from album", and "take picture/movie" in the lowermost field of the display unit 207 together with the icon (step S304). Next, the control unit 202 determines whether or not any one of these items is selected by the selection instruction of the user (step S305). Here, when it is detected that "selection from album" is selected ("select from album" in step S305), the control unit 202 refers to the image information stored in the memory 204 and performs the control to display a list screen of the images (still images or moving images) based on the image information on the display unit 207 (step S306).

Figure 12:
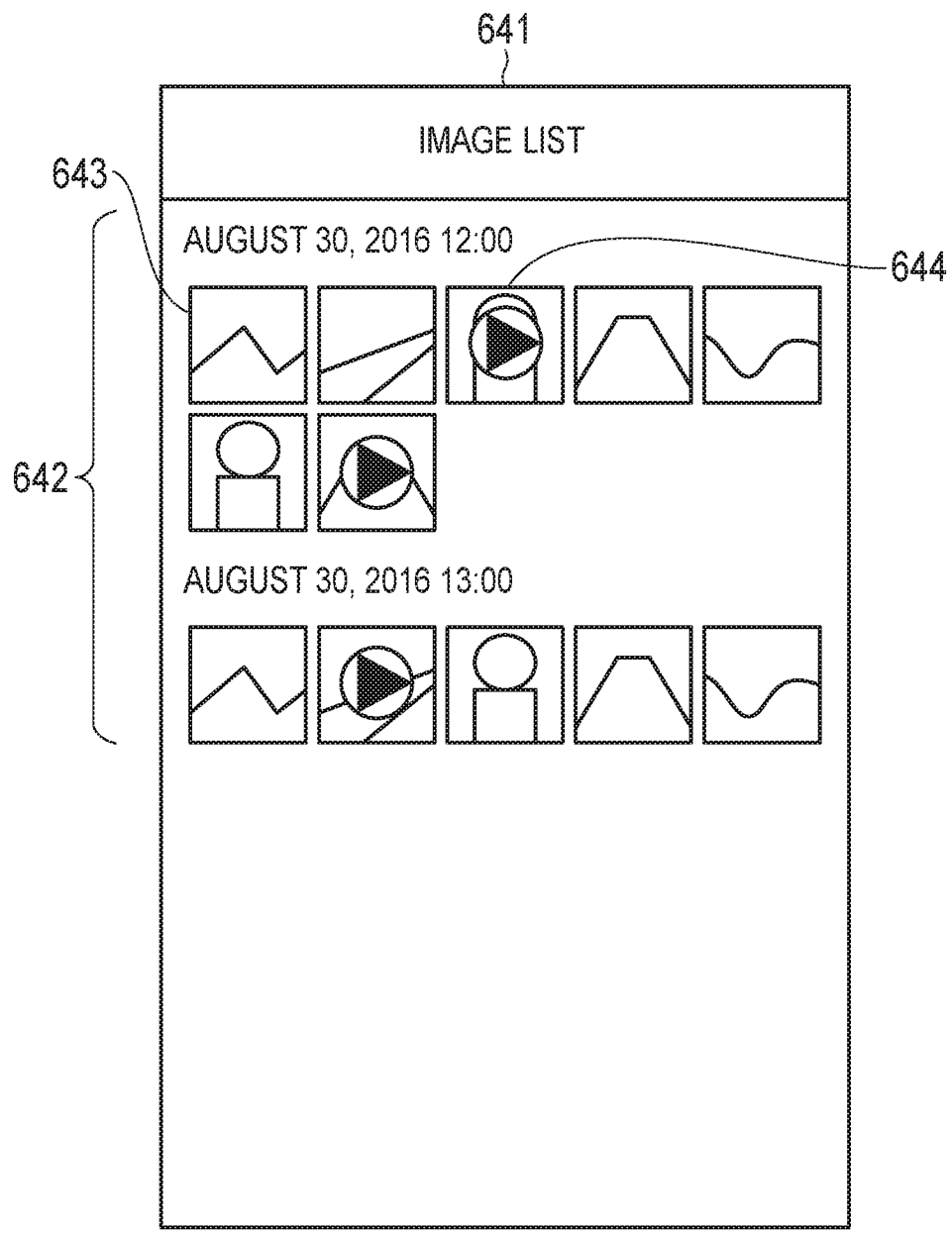
FIG. 12 is a diagram showing an example of an image list screen.

FIG. 12 is a diagram showing an example of the image list screen. An image list screen 641 shown in FIG. 12 includes a display field (image display field) 642 of each image stored in the first communication device 200 for each photographing date/time, a thumbnail icon 643 indicating that the corresponding image information is a still image, and a thumbnail icon 644 indicating that the corresponding image information is a moving image. In FIG. 12, the thumbnail icons 643 and 644 are mixedly displayed, but they may be displayed so as to be distinguishable according to the type of the image information.

While the image list screen 641 shown in FIG. 12 is being displayed, the user of the first communication device 200 operates the operation unit 206 and completes the selection of the image (still image, moving image) to be uploaded, the control unit 202 reads the image information containing image data from the memory 204 and transmits (uploads) the image information to the server 100 (step S307). The image information includes, in addition to the image data, the storyboard ID corresponding to the storyboard screen 631 displayed in step S302, the user ID of the user of the first communication device 200, the photographing date/time, the photographing model (maker code), the type such as a panoramic or dome view image.

On the other hand, when it is detected that "paste label" is selected ("paste label" in step S305), the control unit 202 performs the control to display a keyboard on a part of the display unit 207 (step S308). At this time, the date/time input as a label on the storyboard is also displayed in the text comment input area of the display unit 207. The date/time can be arbitrarily changed only within the occurrence/duration period of the event corresponding to the storyboard. Then, input processing of the date/time and text is performed by detecting the operation by the user (step S309). Furthermore, when confirmation and a transmission instruction with respect to the input date/time and text are detected, the control unit 202 transmits (uploads) the input information (label) to the server 100 (step S310). The label is displayed as a chronological text comment on the storyboard. In other words, the storyboard in the present embodiment functions as a thread related to a specific event, and "paste label" indicates adding the user's own comment on the timeline. Furthermore, when it is detected that "take picture/movie" is selected ("take picture/movie" in step S305), the control unit 202 starts the photographing unit 214 (step S311). The photographing unit 214 performs photographing/recording processing according to the operation by the user (step S312), and outputs the image data to the control unit 202. Then, the control unit 202 stores the image information containing the image data from the photographing unit 214 in the memory 104, and transmits (uploads) the image information containing the image data to the server 100 (step S313).

Figure 13:
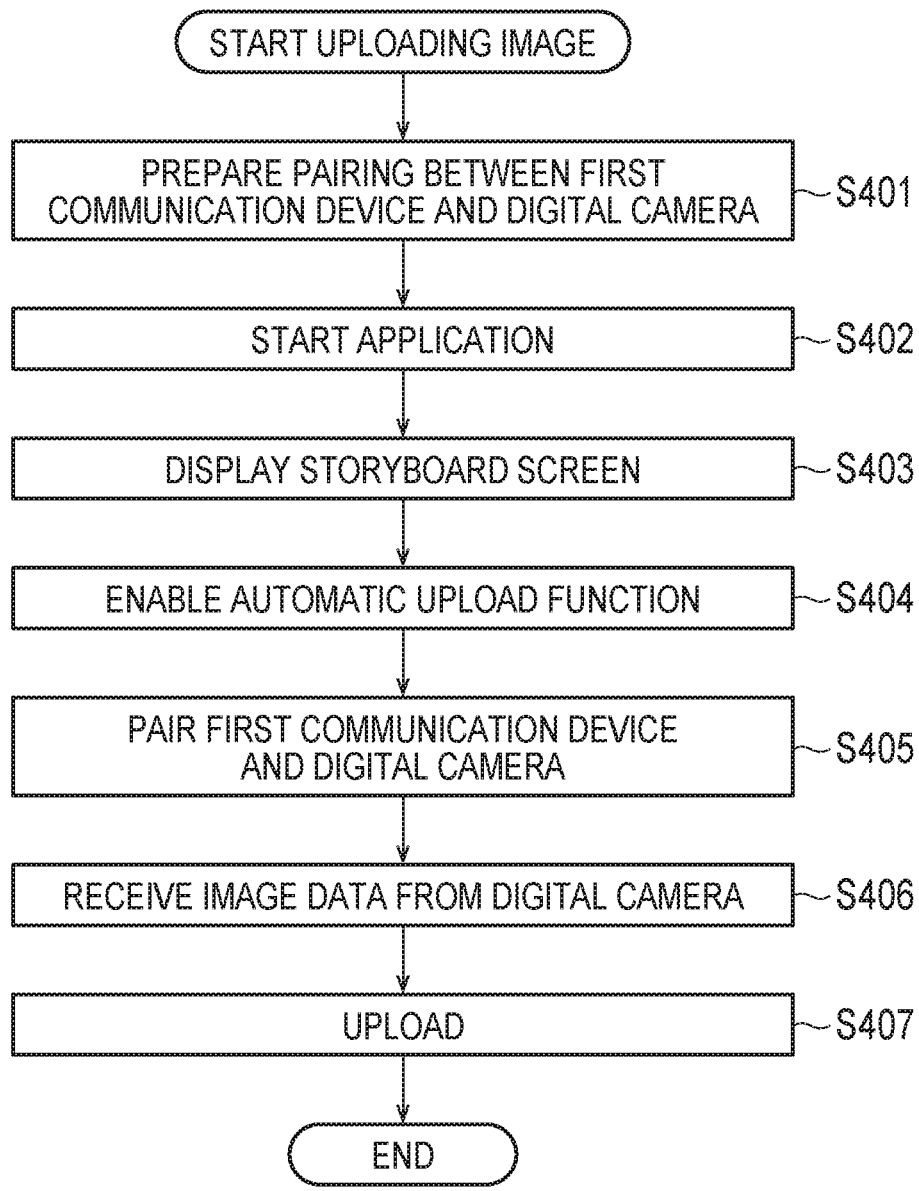
FIG. 13 is a flowchart showing an operation of uploading image information from a digital camera in the first communication device.

FIG. 13 is a flowchart showing an operation of uploading the image from the digital camera 250 to the server 100 via the first communication device 200. In this flowchart, the upload operation in the first communication device 200 will be described, but a similar operation can be performed also in the case of using the second communication device 300 and the digital camera 350.

The control unit 202 in the first communication device 200 prepares pairing to enable wireless communication between the first communication device 200 and the digital camera 250 according to a predetermined operation to the operation unit 206 by the user (step S401). For example, the control unit 202 starts the wireless communication unit 208b to enable wireless communication between the first communication device 200 and the digital camera 250 using the close proximity wireless communication technology.

Next, the control unit 202 starts the application program (application) for the storyboard according to a predetermined operation to the operation unit 206 by the user (step S402). Then, the control unit 202 performs the control to display the storyboard screen on the display unit 207 according to a predetermined operation to the operation unit 206 by the user (step S403).

Thereafter, the control unit 202 enables the automatic uploading function of the image photographed by the digital camera 250 according to a predetermined operation to the operation unit 206 by the user (step S404). For example, when the user enables the automatic uploading function of the image from the digital camera 250 on the new storyboard creating screen 610 shown in FIG. 6 at the time of creating a new storyboard, that is, when the user operates the operation unit 206 and inputs a check mark in the selection field 618 beforehand, the control unit 202 enables the automatic uploading function of the image photographed by the digital camera 250 according to the operation. Also in other situations, when the user operates the operation unit 206 and selects the automatic upload, the automatic upload function of the image photographed by the digital camera 250 is enabled according to the operation. Note that, when the automatic upload function of the image photographed by the digital camera 250 is disabled by the user, the operation in step S404 is not performed, and the series of operations is completed.

After the enabling of the automatic upload function of the image photographed by the digital camera 250 is selected in step S404, the control unit 202 performs pairing between the first communication device 200 and the digital camera 250 (step S405). Here, the control unit 202 transmits and receives, to and from the digital camera 250, various types of information containing the maker code necessary before the image uploading.

Thereafter, the digital camera 250 performs photographing according to the operation by the user, generates the image data of the photographed image, and transmits the image data to the first communication device 200. The control unit 202 in the first communication device 200 receives the image data from the digital camera 250 (step S406). Next, the control unit 202 stores the image information containing the received image data in the memory 104. Furthermore, the control unit 202 transmits (uploads) the image information containing the received image data to the server 100 (step S407).

Figure 14:
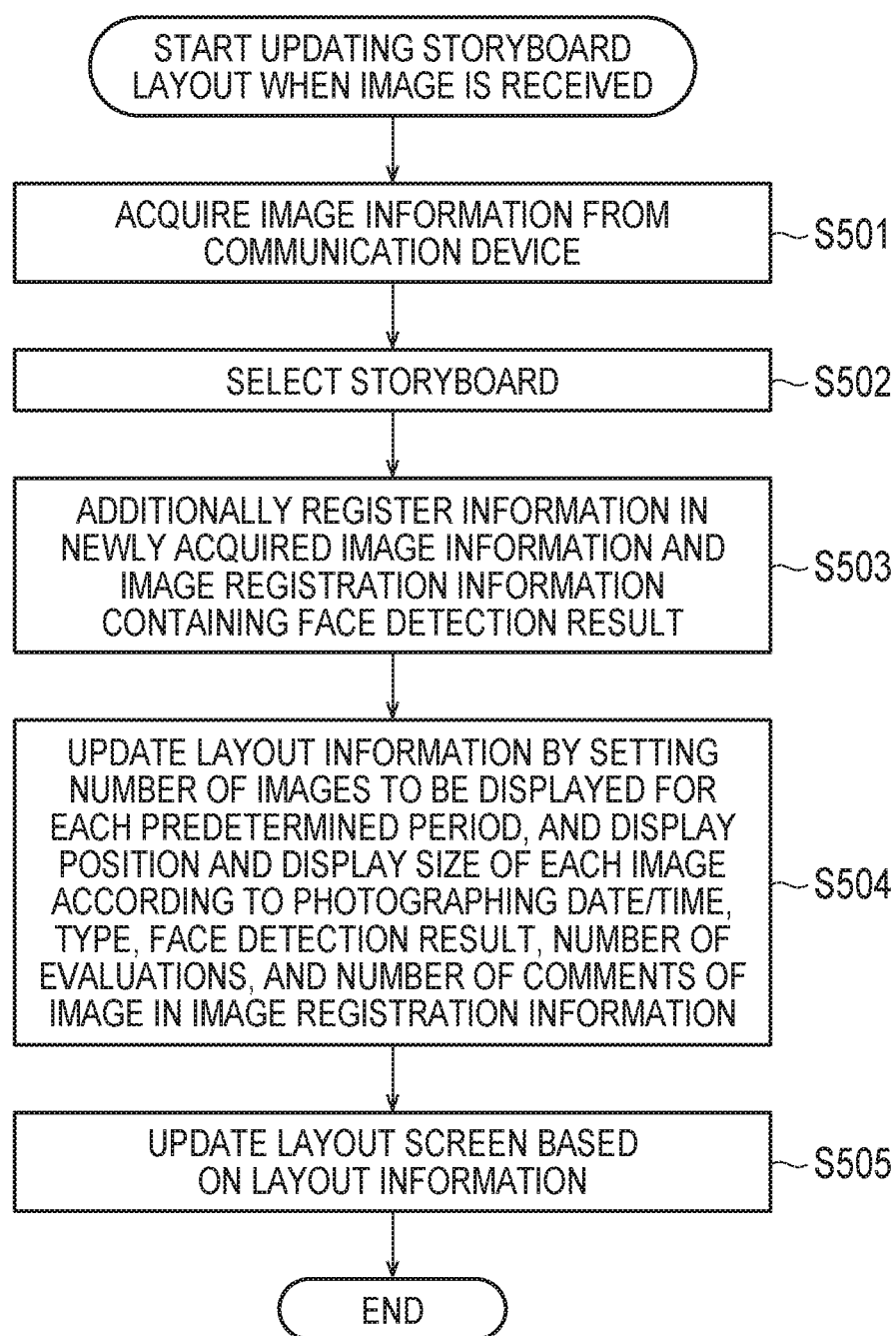
FIG. 14 is a flowchart showing an operation of updating the layout of a storyboard in the server when an image is received.

Next, an operation of updating the layout of the storyboard in the server 100 when the image information is received will be described. FIG. 14 is a flowchart showing the operation of updating the layout of the storyboard in the server 100 when an image is received.

The data acquisition unit 120 in the control unit 102 of the server 100 accepts the login of the user from the first communication device 200 via the communication unit 114 and acquires the image information (step S501).

Next, the group determination unit 124 in the control unit 102 selects a storyboard (step S502). Specifically, the group determination unit 124 refers to the memory 104 by using the user ID of the user logging in as a search key, and specifies the storyboard ID of the event in which the user is included as a participant. Next, the group determination unit 124 acquires the storyboard information containing the storyboard ID that matches the specified storyboard ID among the storyboard information stored in the memory 104. Then, the group determination unit 124 extracts the user ID contained in the acquired image information. Furthermore, the group determination unit 124 determines whether or not the extracted user ID matches either of the creation user ID in the storyboard information or the invited user ID to which the participation flag "1" is set. When the extracted user ID matches either one of the IDs, the user of the first communication device 200 which is the sender of the image information is an authorized user who is allowed to participate in the storyboard. When the extracted user ID matches either the creation user ID in the storyboard information or the invited user ID to which the participation flag "1" is set, the group determination unit 124 selects the storyboard information containing the extracted storyboard ID.

Next, the information acquisition unit 122, the association processing unit 126, the period determination unit 128, the data arrangement unit 130, the display information generation unit 132, and the face image detection unit 134 in the control unit 102 additionally register information in the newly acquired image information and image registration information containing the face detection result (step S503).

Specifically, the information acquisition unit 122 acquires information on the photographing date/time contained in the newly acquired image information. The period determination unit 128 determines whether or not the photographing date/time is within the period from the start date/time to the end date/time based on the acquired information on the photographing date/time, and the start date/time and the end date/time of the event in the storyboard information selected in step S502. When the photographing date/time is not within the period from the start date/time to the end date/time, the series of operations is completed. On the other hand, when the photographing date/time is within the period from the start date/time to the end date/time, the face image detection unit 134 performs existing face detection processing to the image data contained in the image information, and determines whether or not the face image is contained.

Next, the association processing unit 126 sets an image ID to identify the image data in the newly acquired image information. Furthermore, the association processing unit 126 additionally registers new image registration information containing the set image ID, the photographing date/time, the type, and the face detection result contained in the newly acquired image information to the image registration information associated with the storyboard ID in the storyboard information selected in step S502 among the image registration information stored in the memory 104.

FIG. 15 is a diagram showing an example of the image registration information. The image registration information is grouped for each storyboard ID, and the image ID of each image data is associated with the storyboard ID. Furthermore, the image registration information contains, for each image ID, the image data corresponding to the image ID, the photographing date/time, the type, the face detection result, the number of evaluations, the number of comments, the comment text, and photographing location of the image data. At the time when the new image registration information is additionally registered, the number of evaluations and the number of comments are zero, and no comment text is contained.

The description is returned back to FIG. 14. Next, the data arrangement unit 130 and the display information generation unit 132 update the layout information by setting the number of images to be displayed for each predetermined period, and the display position and the display size of each image according to the photographing date/time, the type, the face detection result, the number of evaluations, and the number of comments of the image in the image registration information (step S504).

Specifically, the data arrangement unit 130 specifies the storyboard ID associated with the image registration information registered in step S503. Next, the data arrangement unit 130 reads the storyboard information containing the specified storyboard ID from the memory 104. Furthermore, the data arrangement unit 130 divides the period from the start date/time to the end date/time for each predetermined period (for example, every hour) based on the start date/time and end date/time in the read storyboard information.

Next, the data arrangement unit 130 reads all the image registration information associated with the same storyboard ID as the storyboard ID associated with the image registration information registered in step S503 from the memory 104. Then, the data arrangement unit 130 determines whether or not the photographing date/time in each of the read image registration information belongs to any one of predetermined time periods which have been set. Thus, the number of images for each predetermined period is specified.

Next, the display information generation unit 132 sets, according to the photographing date/time, the type, the face detection result, the number of evaluations, and the number of comments of the images in the read image registration information, the number of images to be displayed, and the display position and the display size of each image for each predetermined period set by the data arrangement unit 130.

Here, various methods can be used for setting the number of images to be displayed, and the display position and the display size of each image for each predetermined period.

First, the display information generation unit 132 sets the number of images that can be displayed in a predetermined period 1. Here, when n number of the image data the photographing date/time of which belongs to the predetermined period 1 is 5 or less, the display information generation unit 132 sets the number of images to be displayed as n. When n number of image data the photographing date/time of which belongs to the predetermined period 1 is equal to or greater than 6 and equal to or less than 19, the display information generation unit 132 sets the largest integer equal to or less than X calculated by X=4/15×n+11/3 as the new n number of images to be displayed. Note that, the above expression is an algorithm expressing an idea that the number of images to be displayed converges gradually according to the number of image data when the number of image data exceeds a certain number, and the expression is not limited to this embodiment as long as it expresses the similar idea.

Furthermore, when n number of image data the photographing date/time of which belongs to the predetermined period 1 is equal to or greater than 20, the display information generation unit 132 sets the number of images to be displayed to 9 (the maximum value). The display information generation unit 132 determines whether or not the image data the photographing date/time of which belongs to the predetermined period 1 is panoramic image data or dome view image data based on the corresponding type. Then, when the image data the photographing date/time of which belongs to the predetermined period 1 contains panoramic image data or dome view image data, the display information generation unit 132 sets the upper limit number of images to be displayed based on the panoramic or dome view image data to be displayed to 3, and selects the other six images photographed in a normal aspect ratio.

Next, the display information generation unit 132 selects the images to be displayed for each predetermined period. Here, the display information generation unit 132 preferentially selects image data corresponding to the face detection result indicating that the face image is included, or image data having a large number of evaluations and comments.

Next, the display information generation unit 132 determines the display size of the selected image. The display size in the description is applied to real image data, or image data in a size for simple reproduction or thumbnail image data which is stored in the image information containing the real image data and means a reduced size or enlarged size. The image data to which the display size is applied includes, in addition to a still image, a frame of moving image data, a panoramic image data, and a dome view image data. In the present embodiment, the display sizes are Lv.1, Lv.3, and Lv.4 in the descending order. Here, the display information generation unit 132 may randomly set the display size of the image data, and set the image data corresponding to the face detection result indicating that the face image is included, or the image data having a large number of evaluations and comments so that the display size thereof is preferentially increased. However, the display information generation unit 132 sets the ratio of the display size of the image data belonging to the predetermined period 1 so that, for example, the ratio of Lv.1:Lv.3:Lv.4 is to be a predetermined ratio such as 1:1.5:6.5.

Furthermore, when setting the display size, the display information generation unit 132 sets the display size so that the images corresponding to the sizes Lv.1, Lv.3, and Lv.4 are to be dispersedly displayed when the images corresponding to the image data belonging to the predetermined period 1 are displayed in chronological order. Here, when the images corresponding to the image data belonging to the predetermined period 1 are displayed in chronological order, the display information generation unit 132 determines the display sizes so that the images corresponding to the image data Lv.3 and Lv.4 are not to be displayed continuously.

Next, the display information generation unit 132 sets the display position of each image to which the display size is set in the display area for the corresponding predetermined period. Here, in the first display position setting method, the display information generation unit 132 arranges the image corresponding to the image data in chronological order in the display area for the corresponding predetermined period, and arranges the image corresponding to the next image data in a direction orthogonal to the scrolling direction, that is, at the right side of the screen in this embodiment. However, when the display size exceeds the display range in the lateral direction because the display size is large, the display information generation unit 132 arranges the image corresponding to the next image data in a direction parallel to the scroll direction, that is, at the lower side in the present embodiment. The display information generation unit 132 repeats such display position setting. In the second display position setting method, when the display size of the image data corresponding to the face detection result indicating that the face image is included, or the image data having a large number of evaluations and comments is set to Lv.1 which is the maximum size, the display information generation unit 132 arranges the image corresponding to the image data having the display size Lv.1 at the top in the display area for the corresponding predetermined period in the maximum size in the lateral direction. Then, with respect to the other images, the display information generation unit 132 arranges the image corresponding to the image data in chronological order, and arranges the image corresponding to the next image data at the right side.

Next, the display information generation unit 132 updates the layout information according to the setting of the number of images to be displayed, and the display size and the display position of each image for each predetermined period. FIG. 16 is a diagram showing an example of the layout information. The layout information is generated for each storyboard, and the storyboard ID of the corresponding storyboard is associated with each predetermined period. Furthermore, each predetermined period is associated with the image ID of the image displayed in the corresponding predetermined period, and the display position and the display size of the image. The layout information is stored in the memory 104. When there is no image to be displayed in a predetermined period (when there is no image the photographing date/time of which is not included in the predetermined period), the corresponding predetermined period is not associated with the image ID, the display position, and the display size.

The description is returned back to FIG. 14. Next, the display information generation unit 132 updates, based on the layout information, the layout screen in which the images are arranged for each predetermined period (step S505). The layout screen information contains information such as image data, the display position of each image, the image ID of the registered image, the photographing date/time, the map screen, and the like. Furthermore, when the layout screen contains a panoramic image or a dome view image, the layout screen information contains display control information for displaying a part of the panoramic image or the dome view image according the operation instruction of selecting the panoramic image or the dome view image by the users of the first communication device 200 and the second communication device 300, or according to the display position of the panoramic image or the dome view, and display control information for displaying the entire of the panoramic image or the dome view image by scrolling. The map screen included in the layout screen is displayed at the lowermost part when the map screen around the point to which the pin is added in creating a new storyboard is scrolled in a downward direction of the screen. On the map screen, a pin is newly added to the position based on the photographing location recorded in the screen registration information shown in FIG. 15, and the map screen is updated and displayed. The layout screen information is stored in the memory 104. When there is a predetermined period with which the image ID, the display position, and the display size are not associated in the layout information, the display information generation unit 132 updates the layout screen so that the display corresponding to the predetermined period includes only the information indicating the elapse of time (for example, the date/time information).

Thereafter, when the application programs for the storyboard are started in the first communication device 200 and the second communication device 300, the control unit 102 in the server 100 receives the start information indicating that the programs have been started, and transmits the layout screen information stored in the memory 104 to the first communication device 200 and the second communication device 300 which are the senders of the start information.

The control units 202 in the first communication device 200 and the second communication device 300 acquire the layout screen information from the server 100 and store it in the memory 204. Thereafter, when desiring to display the layout screen hidden in the lower part of the screen while the storyboard screen 631 shown in FIG. 9 is being displayed, the users of the first communication device 200 and the second communication device 300 operate the operation unit 206 and select the scroll button icon 633. When the scroll button icon 633 is selected, the control unit 202 performs the control to read the layout screen information stored in the memory 204, move the storyboard screen to the upper side of the screen, and display the layout screen instead of the storyboard screen on the display unit 207. Note that, when the scroll button icon 633 is selected without storing the layout screen information in the memory 204 beforehand, the control unit 202 may perform the control to communicate with the server 100, and acquire the layout screen information from the server 100 to the server 100, and display the layout screen on the display unit 207.

Figure 19:
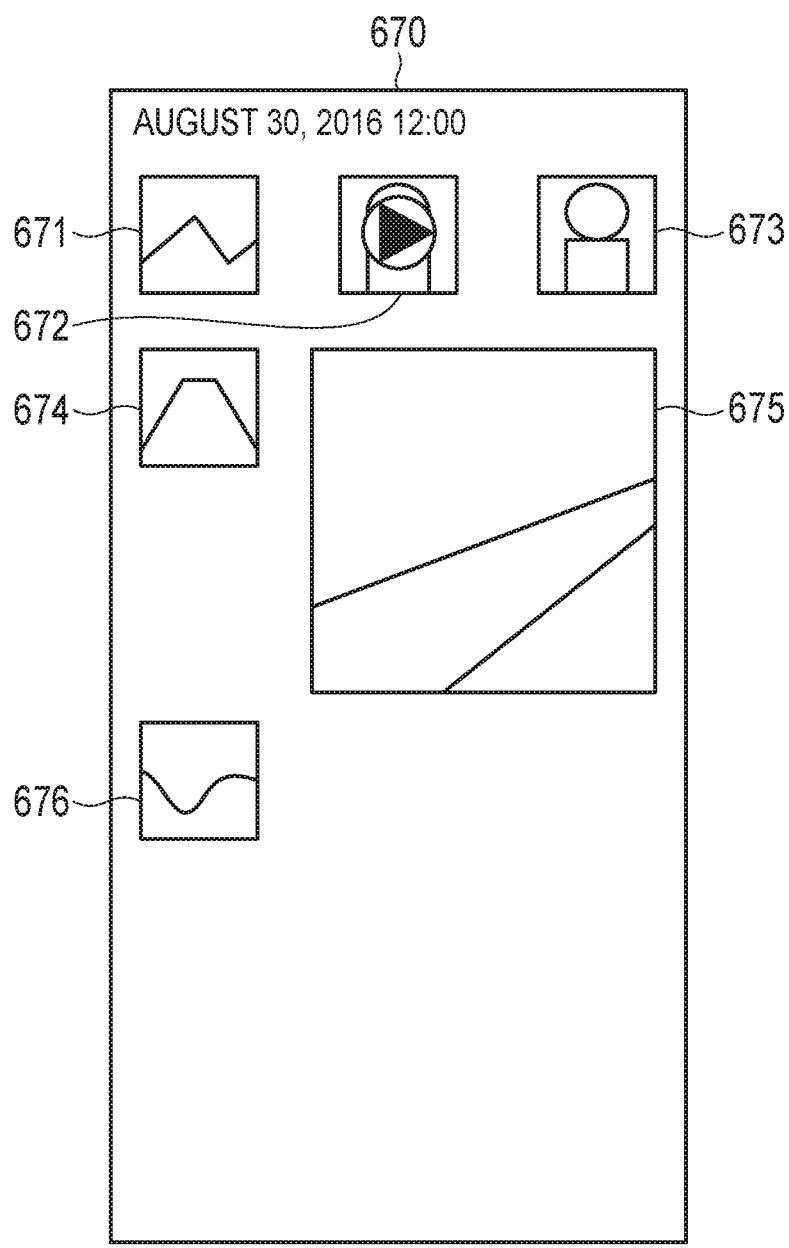
FIG. 19 is a diagram showing a third example of the layout screen.
Figure 20:
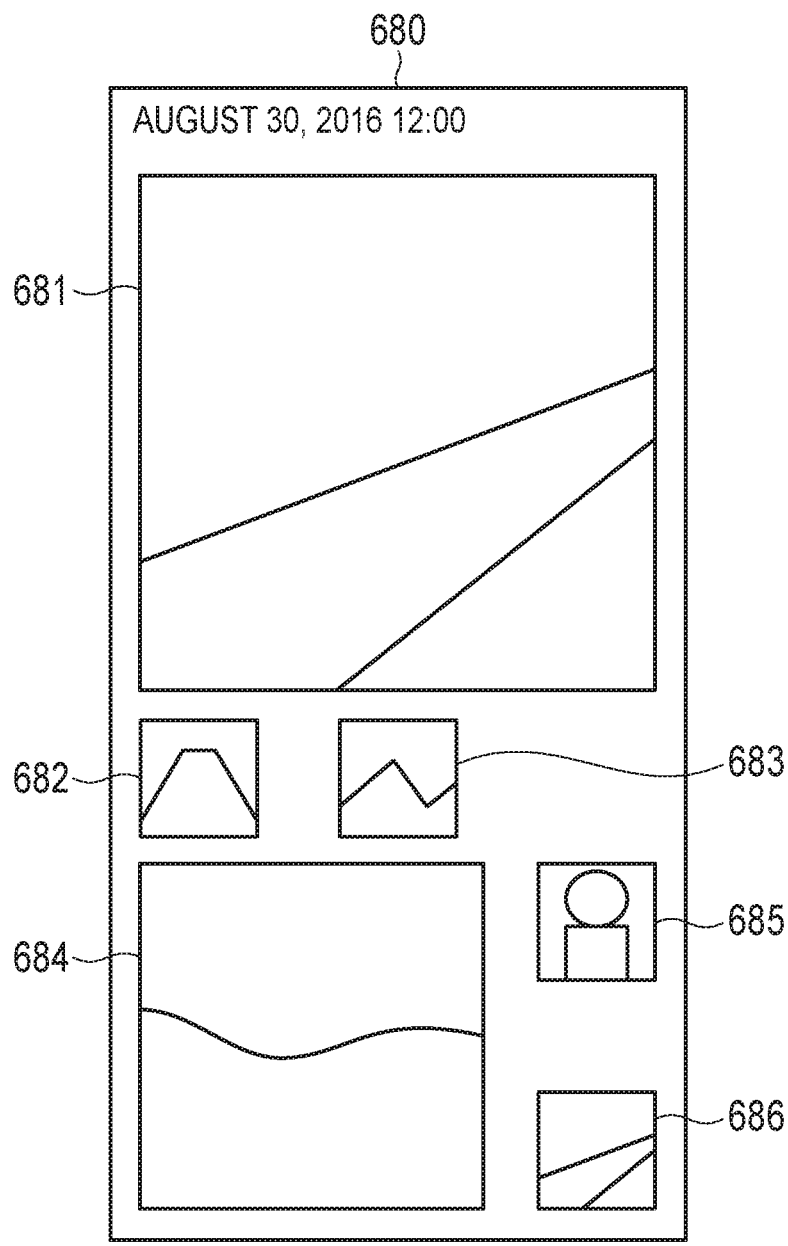
FIG. 20 is a diagram showing a fourth example of the layout screen.
Figure 21:
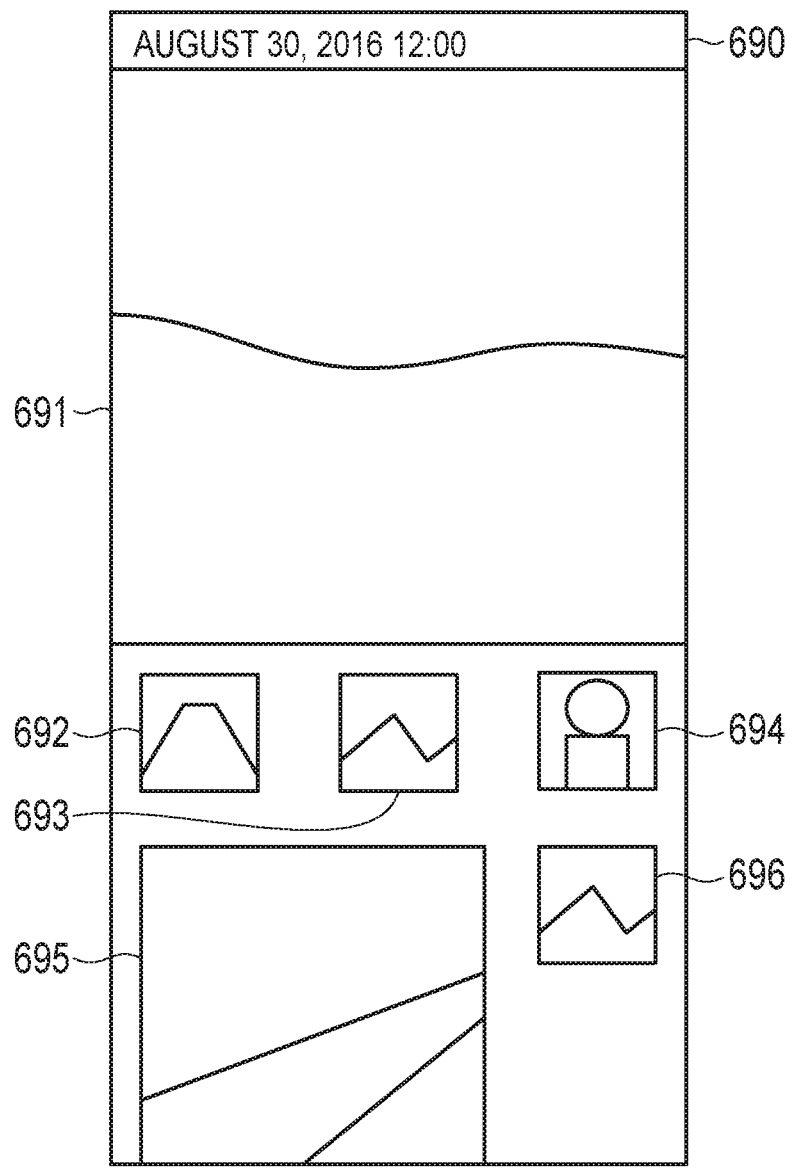
FIG. 21 is a diagram showing a fifth example of the layout screen.
Figure 22:
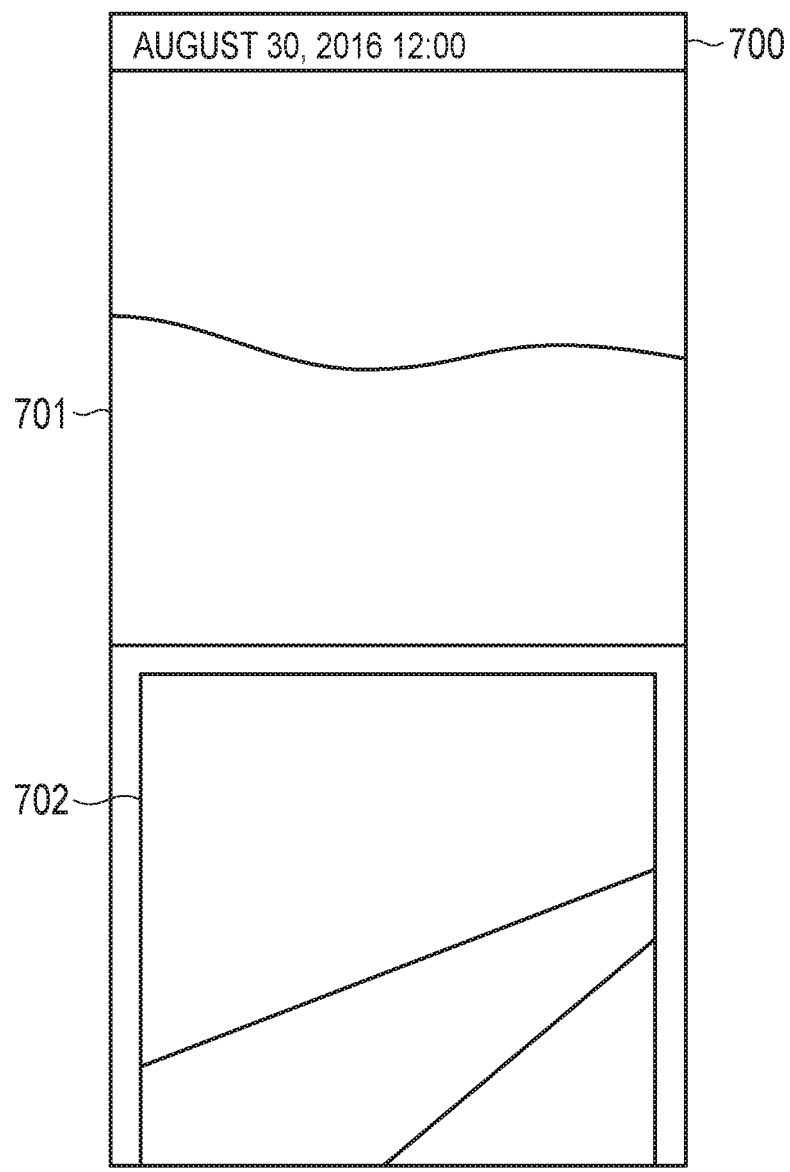
FIG. 22 is a diagram showing a sixth example of the layout screen.
Figure 23:
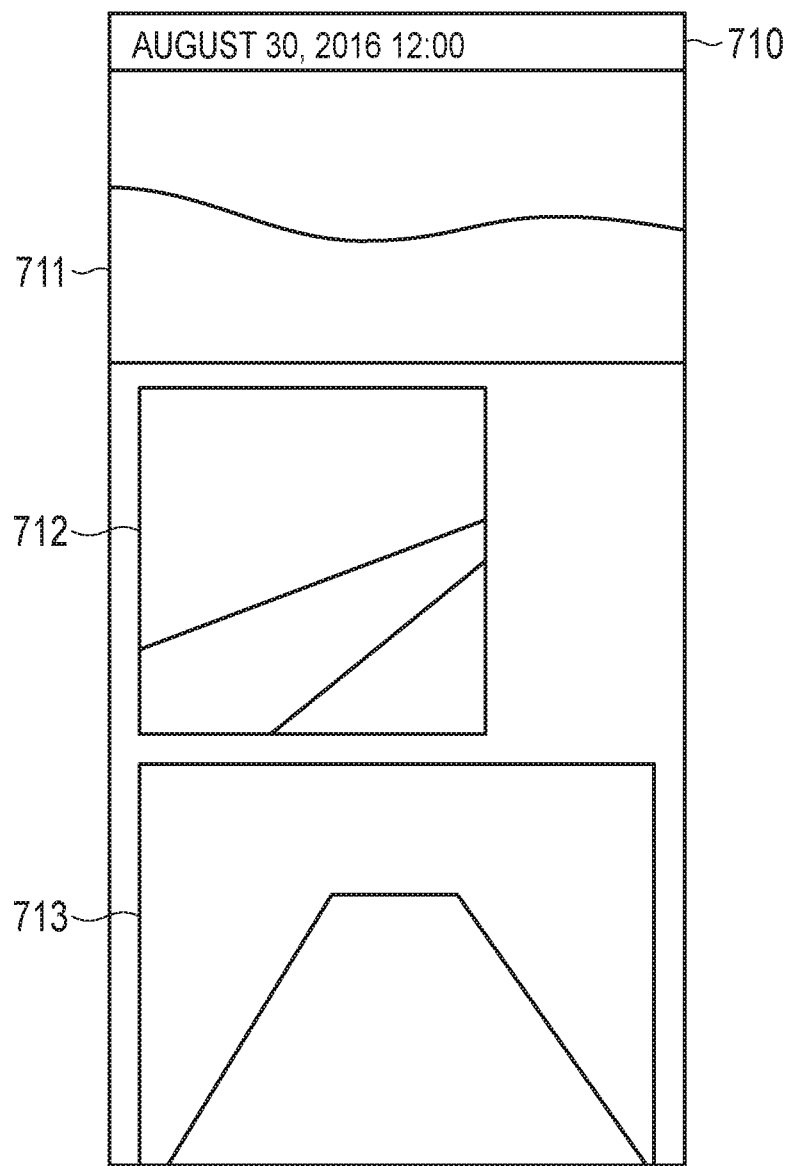
FIG. 23 is a diagram showing a seventh example of the layout screen.

FIGS. 17 to 23 are diagrams showing examples of layout screens. The layout screens shown in FIGS. 17 to 20 are examples in the case where the display information generation unit 132 in the control unit 102 of the server 100 updates the layout information by the above first display position setting method, and FIGS. 21 to 23 are examples in the case where the display information generation unit 132 updates the layout information by the above second display position setting method.

Here, since the display range in the lateral direction of the screen which is a direction orthogonal to the scroll direction (hereinafter, simply referred to as a lateral direction) is taken into consideration, when a Lv.1 image is displayed, other images are not displayed in the lateral direction. Furthermore, when a Lv.3 image is displayed, a Lv.4 image can be displayed side by side in the lateral direction. Moreover, three Lv.4 images can be displayed side by side. In the layout screen, the display is controlled in the direction parallel to the scroll direction so that the display interval of the images in the longitudinal direction is enlarged or reduced according to the scroll display. By such control, it is possible to produce a layout screen with various motions.

Figure 17:
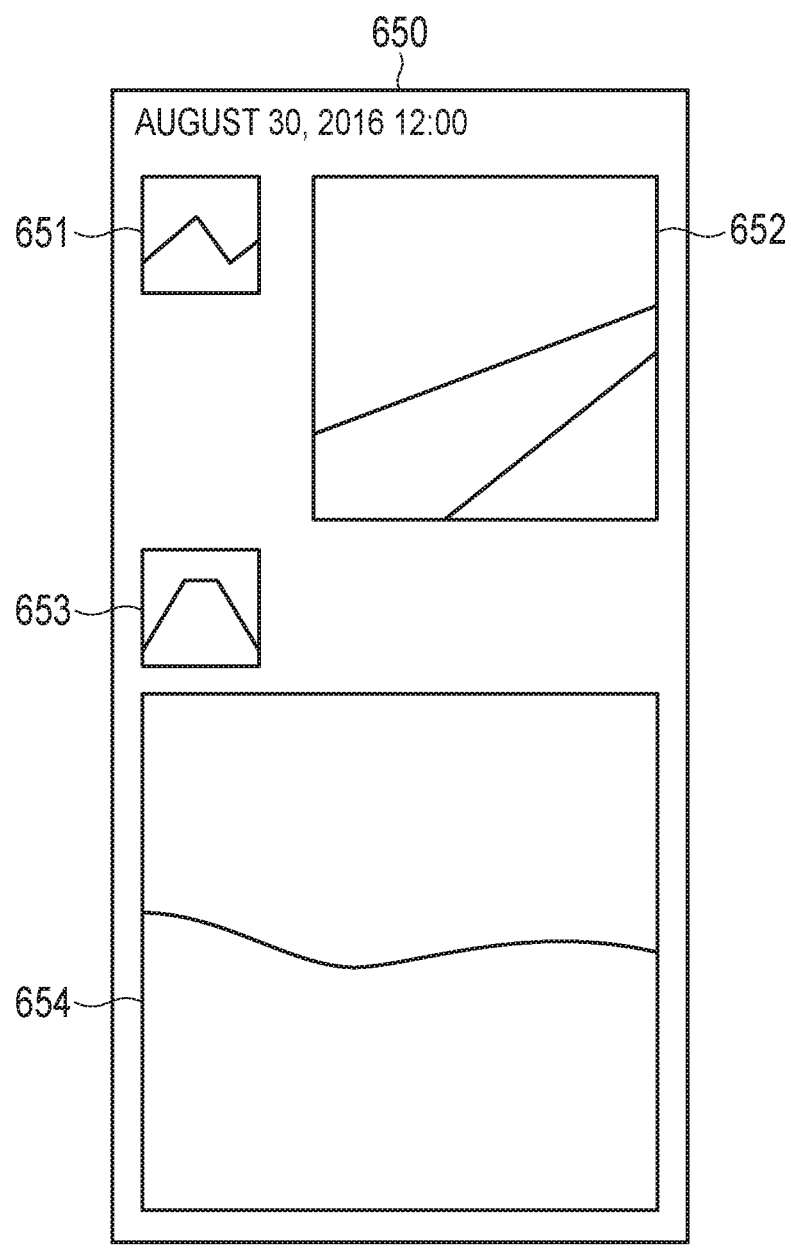
FIG. 17 is a diagram showing a first example of a layout screen.

In a layout screen 650 shown in FIG. 17, a Lv.4 image 651 and a Lv.3 image 652 are arranged in the lateral direction, and a Lv.4 image 653 is arranged under the Lv.4 image 651 and the Lv.3 image 652, that is, in a downward direction of the screen which is parallel to the scroll direction (hereinafter, simply referred to as a downward direction). Furthermore, a Lv.1 image 654 is arranged in the downward direction of the Lv.4 image 653.

Figure 18:
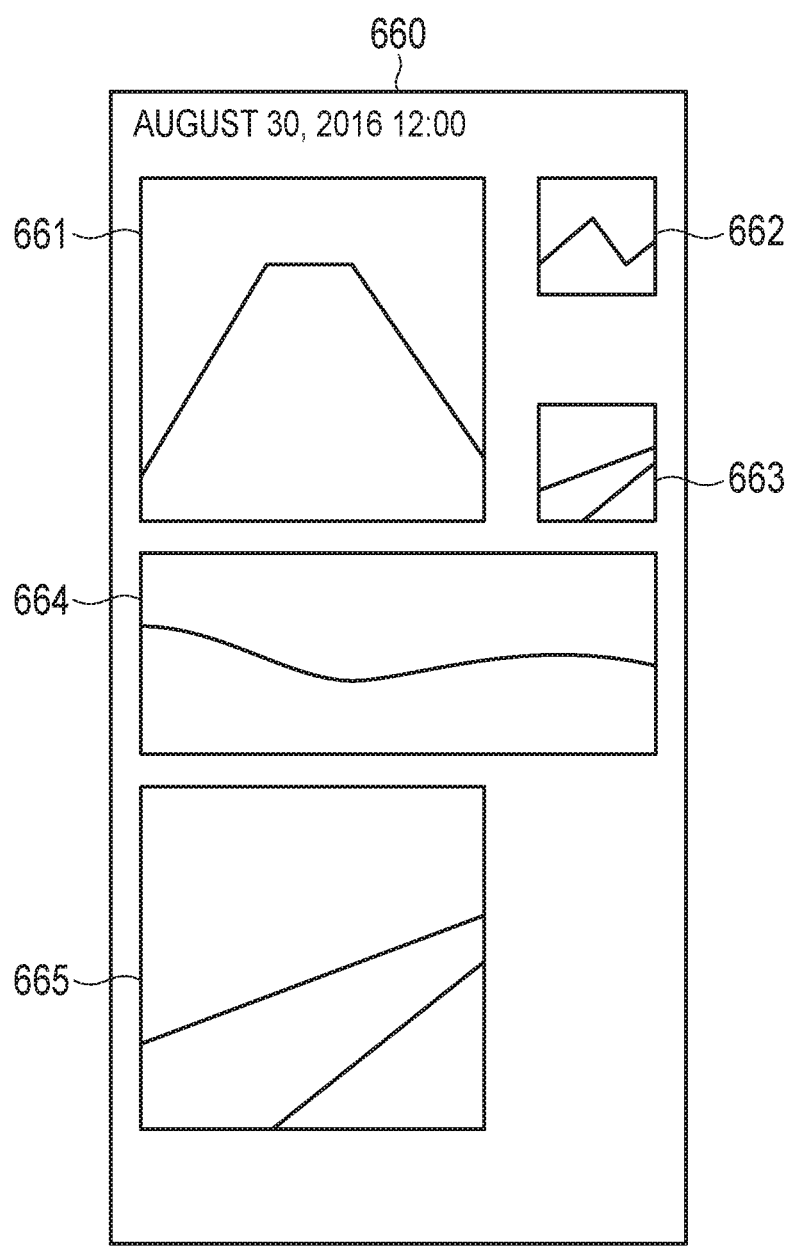
FIG. 18 is a diagram showing a second example of the layout screen.

In a layout screen 660 shown in FIG. 18, a Lv.3 image 661, a Lv.4 image 662, and a Lv.4 image 663 are arranged in the lateral direction, and the Lv.4 image 663 is arranged in the downward direction of the Lv.4 image 662. Furthermore, a Lv.1 image 664 the type of which is a panorama is arranged in the downward direction of the Lv.3 image 661, the Lv.4 image 662, and the Lv.4 image 663, and a Lv.3 image 665 is arranged in the downward direction of the Lv.1 image 664.

In a layout screen 670 shown in FIG. 19, Lv.4 images 671, 672, and 673 are arranged in the lateral direction. Furthermore, in the downward direction of the Lv.4 images 671, 672, and 673, a Lv.4 image 674 and a Lv.3 image 675 are arranged in the lateral direction. Furthermore, a Lv.4 image 676 is arranged in the downward direction of the Lv.4 image 674 and the Lv.3 image 675. Note that, the image 672 means that the image data is a moving image.

In a layout screen 680 shown in FIG. 20, a Lv.1 image 681 is arranged. Furthermore, in the downward direction of the Lv.1 image 681, Lv.4 images 682 and 683 are arranged in the lateral direction. In the downward direction of the Lv.4 images 682 and 683, a Lv.3 image 684, a Lv.4 image 685, and a Lv.4 image 686 are arranged in the lateral direction, and the Lv.4 image 686 is arranged in the downward direction of the Lv.4 image 685.

In a layout screen 690 shown in FIG. 21, a Lv.1 image 691 is arranged in the maximum size in the lateral direction. Furthermore, in the downward direction of the Lv.1 image 691, Lv.4 images 692, 693, and 694 are arranged in the lateral direction. Furthermore, in the downward direction of the Lv.4 images 692, 693, and 694, a Lv.3 image 695 of and a Lv.4 image 696 are arranged in the lateral direction.

In a layout screen 700 shown in FIG. 22, a Lv.1 image 701 is arranged in the maximum size in the lateral direction. Furthermore, a Lv.3 image 702 is arranged in the downward direction of the Lv.1 image 701.

In a layout screen 710 shown in FIG. 23, a Lv.1 image 711 the type of which is a panorama is arranged in the maximum size in the lateral direction. Furthermore, a Lv.3 image 712 is arranged in the downward direction of the Lv.1 image 711. Furthermore, in the downward direction of the Lv.3 image 712, a Lv.1 image 713 the type of which is a panorama is arranged.

Figure 24:
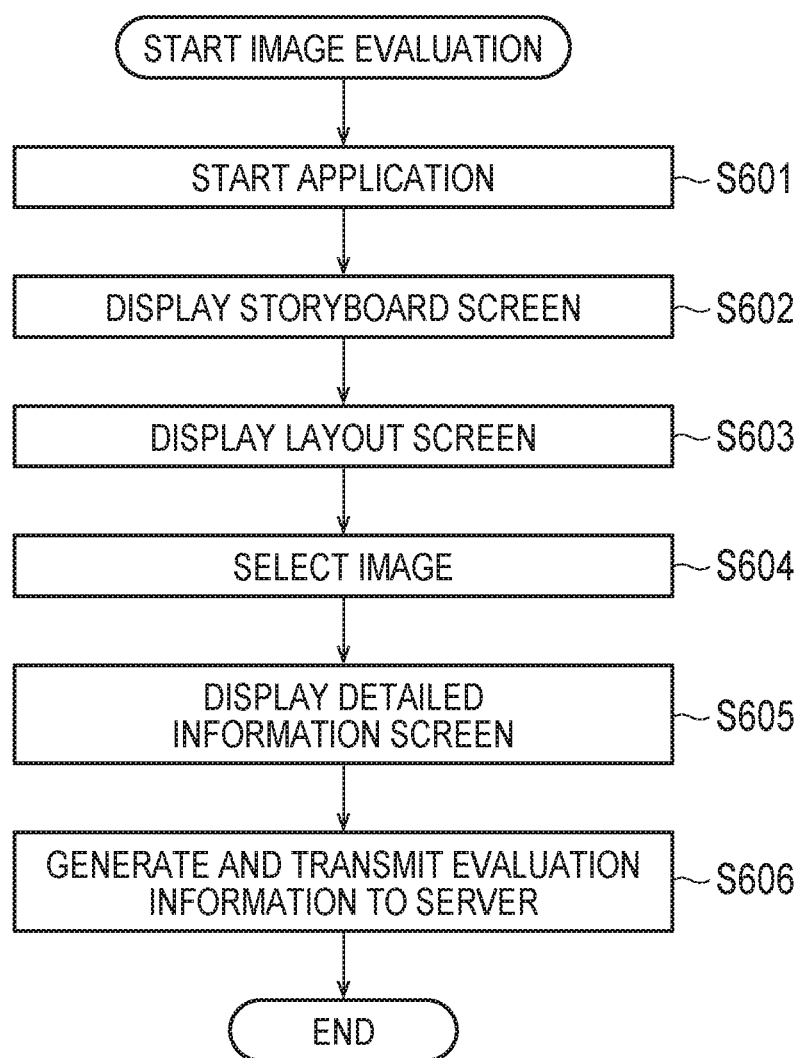
FIG. 24 is a flowchart showing an operation of image evaluation in the second communication device.

Next, an operation of image evaluation in the second communication device 300 will be described. FIG. 24 is a flowchart showing the operation of image evaluation in the second communication device 300.

The control unit 202 in the second communication device 300 starts the application program (application) for the storyboard according to a predetermined operation to the operation unit 206 by the user (step S601). Then, the control unit 202 performs the control to display the storyboard screen on the display unit 207 according to a predetermined operation to the operation unit 206 by the user (step S602).

When desiring to display the layout screen while the storyboard screen 631 shown in FIG. 9 is being displayed, the user of the second communication device 300 operates the operation unit 206 and selects the scroll button icon 633. When the scroll button icon 633 is selected, the control unit 202 performs the control to display the layout screen on the display unit 207 based in the layout screen information received from the server 100 (step S603).

Thereafter, when the user of the second communication device 300 operates the operation unit 206 and selects an image which the user desires to evaluate from the images displayed in the layout screen, the control unit 202 recognizes that the image is selected (step S604), and performs the control to display a detailed information screen of the image on the display unit 207 (step S605).

Figure 25:
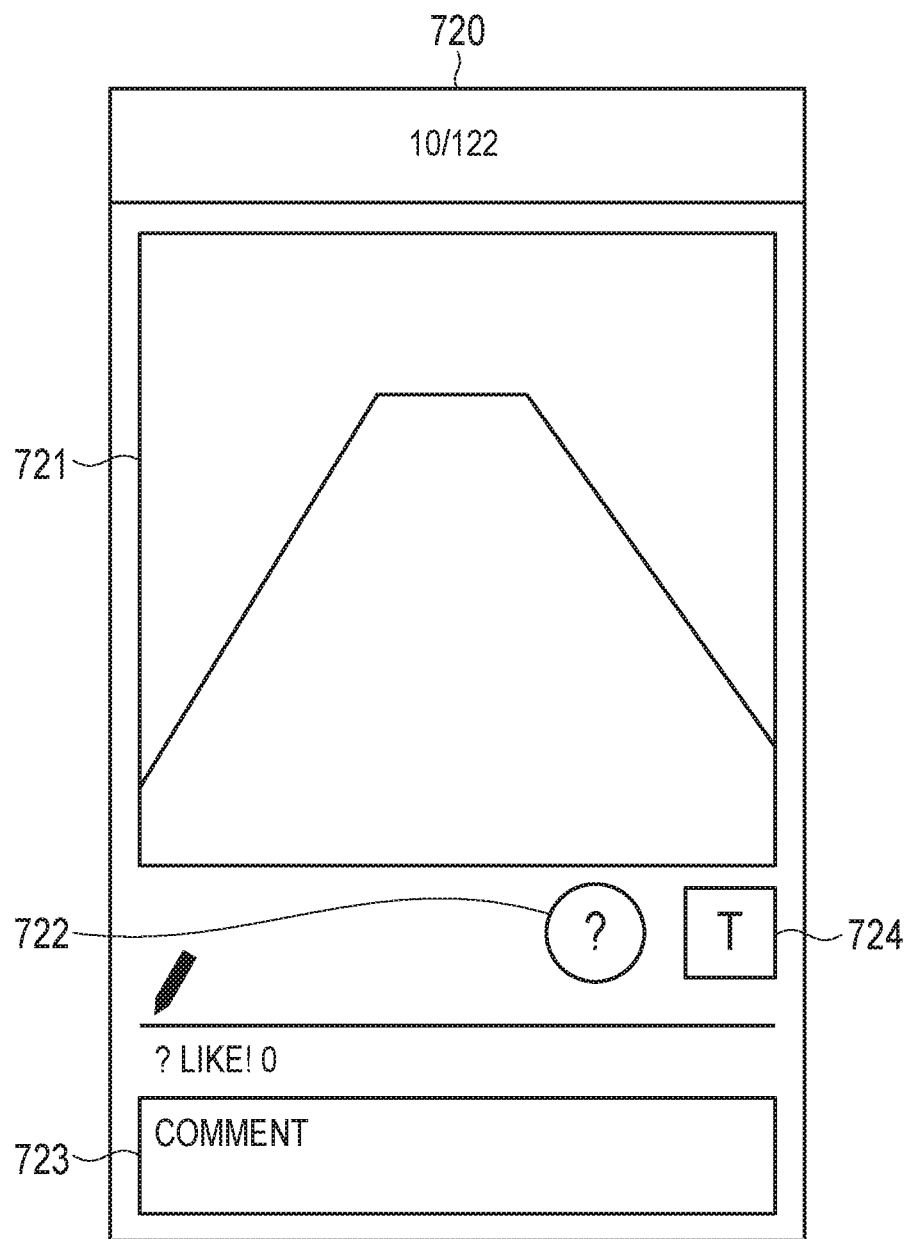
FIG. 25 is a diagram showing an example of detailed information screen.

FIG. 25 is a diagram showing an example of the detailed information screen. A detailed information screen 720 shown in FIG. 25 includes an evaluation target image 721, an evaluation button icon 722, a comment input field 723, and a composite comment button icon 724.

When evaluating the evaluation target image 721 as good while the detailed information screen 720 shown in FIG. 25 is being displayed, the user of the second communication device 300 operates the operation unit 206 and selects the evaluation button icon 722. When the evaluation button icon 722 is selected, a heart-shaped symbol is displayed so as to be superimposed on the image, and three levels of heart-shaped symbols are cyclically superimposed and displayed according to the temporal length of the selection operation to the evaluation button icon 722 (specifically, the length of the contact time of the user's finger on the evaluation button icon 722). The size of the heart-shaped symbol represents the evaluation value, and the evaluation value is increased from Lv.1 (evaluation value=1), Lv.2 (evaluation value=2), and Lv.3 (evaluation value=3) in the ascending order of the symbols. Then, the size of the symbol being displayed at the timing when the selection operation is stopped (the user releases the finger from the evaluation button icon 722) is set as the evaluation value. In addition, the evaluation value is added according to the model (manufacturer code) of the digital camera 250 contained in the image information. The control unit 202 generates evaluation information containing the corresponding storyboard ID, the user ID, the evaluation target image ID, and the evaluation value, and transmits the evaluation information to the server 100 (step S606).

Figure 26:
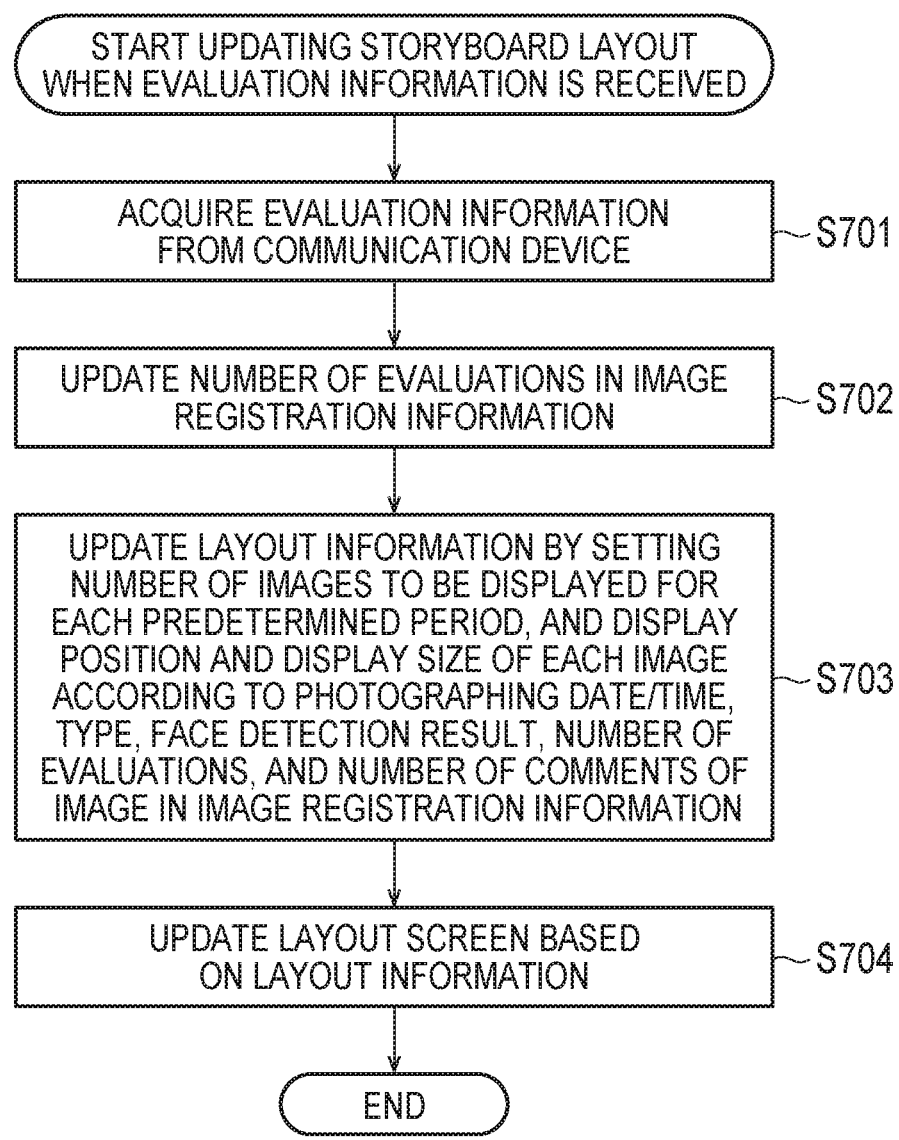
FIG. 26 is a flowchart showing an operation of updating the layout of a storyboard in the server when evaluation information is received.

Next, an operation of updating the layout of the storyboard in the server 100 when the evaluation information is received will be described. FIG. 26 is a flowchart showing the operation of updating the layout of the storyboard in the server 100 when the evaluation information is received.

The data acquisition unit 120 in the control unit 102 of the server 100 acquires the evaluation information from the second communication device 300 via the communication unit 114 (step S701).

Next, the display information generation unit 132 updates the evaluation value contained in the image registration information (step S702). Specifically, the display information generation unit 132 selects the image registration information the image ID of which matches the image ID in the evaluation information among the image registration information stored in the memory 104. Furthermore, the display information generation unit 132 adds the evaluation value in the evaluation information received this time to the evaluation value in the selected image registration information and updates it.

Next, the data arrangement unit 130 and the display information generation unit 132 update the layout information by setting the number of images to be displayed for each predetermined period, and the display position and the display size of each image according to the photographing date/time, the type, the face detection result, the number of evaluations, and the number of comments of the image in the image registration information (step S703). The specific processing is similar to that in step S504 of FIG. 14, and the description thereof is omitted.

Next, the display information generation unit 132 updates, based on the layout information, the layout screen in which the images are arranged for each predetermined period (step S704). The specific processing is similar to that in step S505 of FIG. 14, and the description thereof is omitted.

Next, an operation of comment setting in the second communication device 300 will be described. The operation of comment setting in the second communication device 300 is similar to that of the flowchart of FIG. 24.

However, the following processing is performed in step S606 in the second communication device 300. That is, when setting the comment while the detailed information screen 720 shown in FIG. 25 is being displayed, the user of the second communication device 300 operates the operation unit 206, selects the comment input field 723, and sets the comment text (inputs characters). When the comment is set, the control unit 202 generates comment information containing the corresponding storyboard ID, the user ID, the comment target image ID, the comment text, and the like, and transmits the comment information to the server 100.

Figure 27:
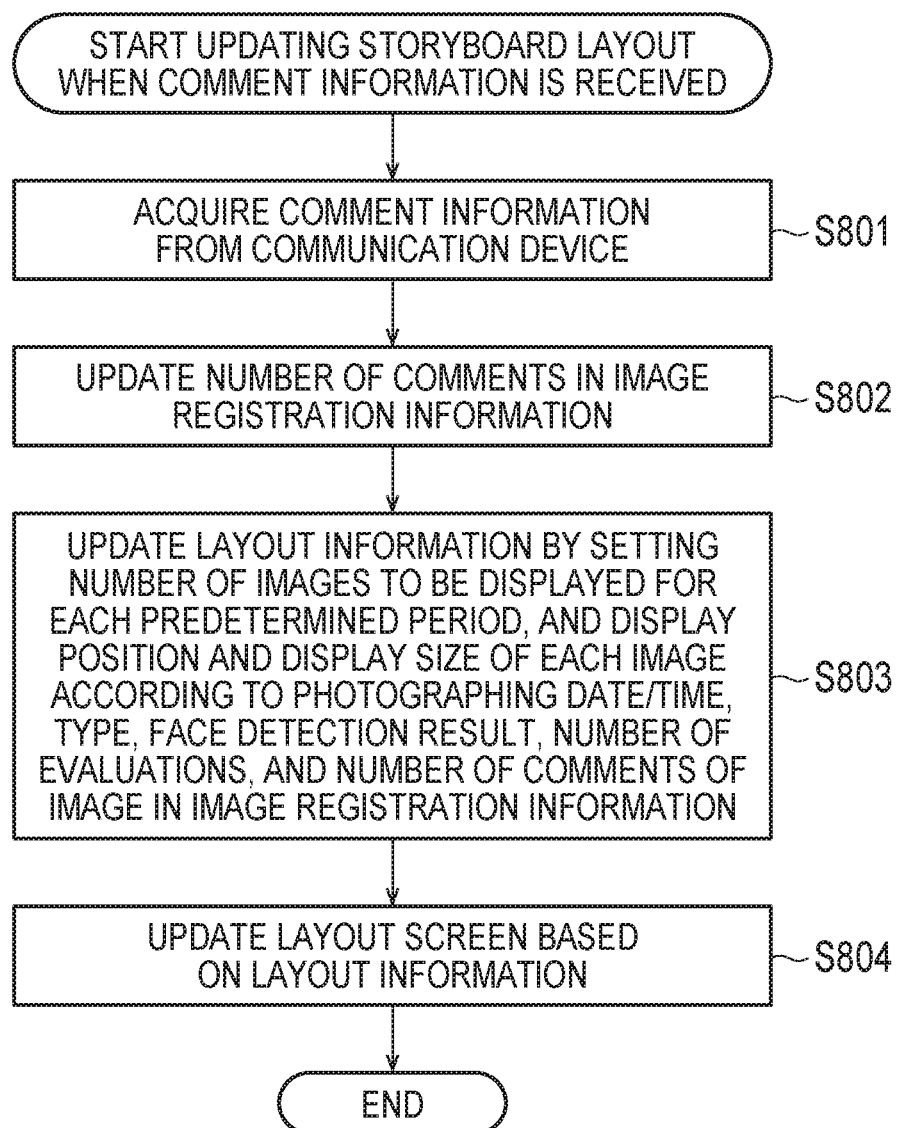
FIG. 27 is a flowchart showing an operation of updating the layout of a storyboard in the server when comment information is received.

Next, an operation of updating the layout of the storyboard in the server 100 when the comment information is received will be described. FIG. 27 is a flowchart showing the operation of updating the layout of the storyboard in the server 100 when the comment information is received.

The data acquisition unit 120 in the control unit 102 of the server 100 acquires the comment information from the second communication device 300 via the communication unit 114 (step S801).

Next, the display information generation unit 132 updates the number of comments contained in the image registration information (step S802). Specifically, the display information generation unit 132 selects the image registration information the image ID of which matches the image ID in the evaluation information among the image registration information stored in the memory 104. Furthermore, the display information generation unit 132 increases the number of comments in the selected image registration information by one. Furthermore, the display information generation unit 132 adds the comment text in the comment information to the selected image registration information.

Next, the data arrangement unit 130 and the display information generation unit 132 update the layout information by setting the number of images to be displayed for each predetermined period, and the display position and the display size of each image according to the photographing date/time, the type, the face detection result, the number of evaluations, and the number of comments of the image in the image registration information (step S803). The specific processing is similar to that in step S504 of FIG. 14, and the description thereof is omitted.

Next, the display information generation unit 132 updates, based on the layout information, the layout screen in which the images are arranged for each predetermined period (step S804). The specific processing is similar to that in step S505 of FIG. 14, and the description thereof is omitted.

Figure 28:
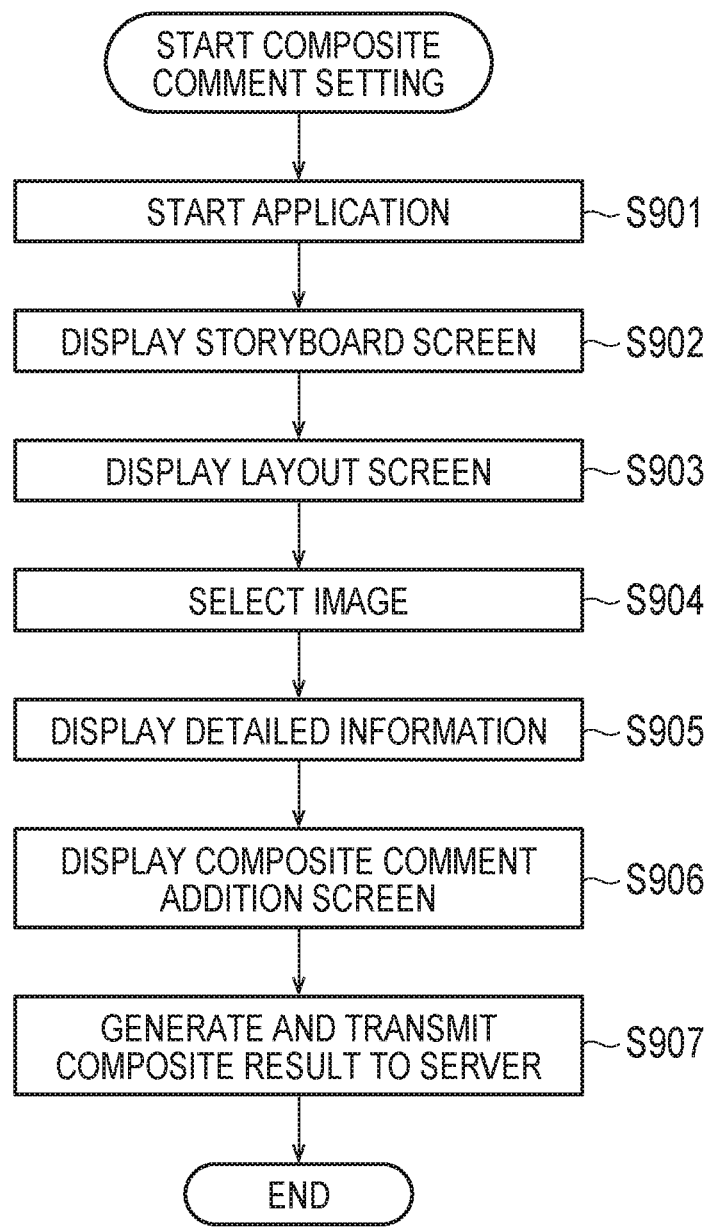
FIG. 28 is a flowchart showing an operation of composite comment setting in the second communication device.

Next, an operation of composite comment setting in the second communication device 300 will be described. FIG. 28 is a flowchart showing the operation of composite comment setting in the second communication device 300. The operations in steps S901 to S905 are similar to those in steps S601 to S605 of FIG. 24, and the description thereof is omitted.

When setting the composite comment while the detailed information screen 720 shown in FIG. 25 is being displayed, the user of the second communication device 300 operates the operation unit 206 and selects the composite comment button icon 724. When the composite comment button icon 724 is selected, the control unit 202 performs the control to display a composite comment adding screen on the display unit 207 (step S906).

Figure 29:
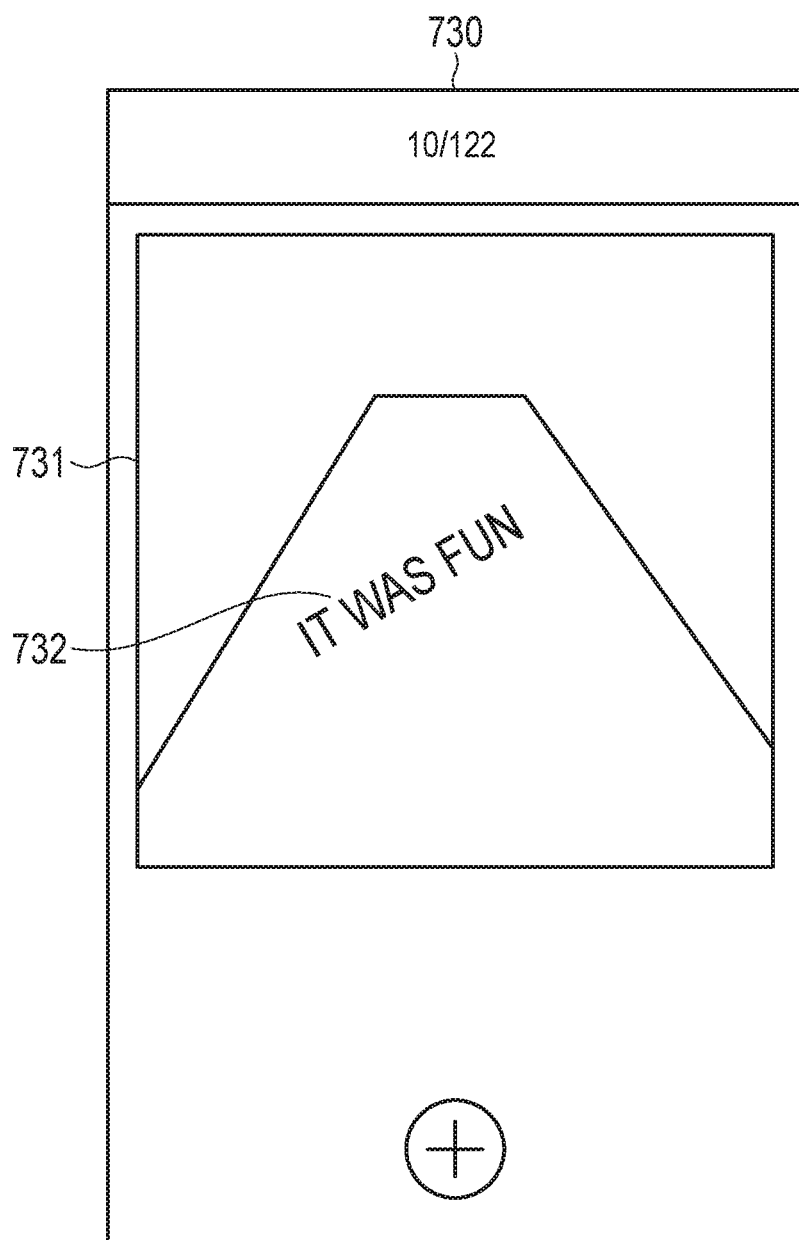
FIG. 29 is a diagram showing an example of a composite comment adding screen.

FIG. 29 is a diagram showing an example of the composite comment adding screen. A composite comment adding screen 730 shown in FIG. 29 includes a composite comment addition target image 731 and a composite comment 732.

While the composite comment adding screen 730 shown in FIG. 29 is being displayed, the user of the second communication device 300 operates the operation unit 206 and inputs a composite comment text. When the composite comment text is selected and the determination is detected, the control unit 202 captures the composite result in which the composite comment 732 is added to the image 731, and generates new image information from the composite result separately from the image information before the composition. Then, the control unit 202 transmits the corresponding storyboard ID, the user ID, the new image information, and a replace target image ID to the server 100 (step S907).

Figure 30:
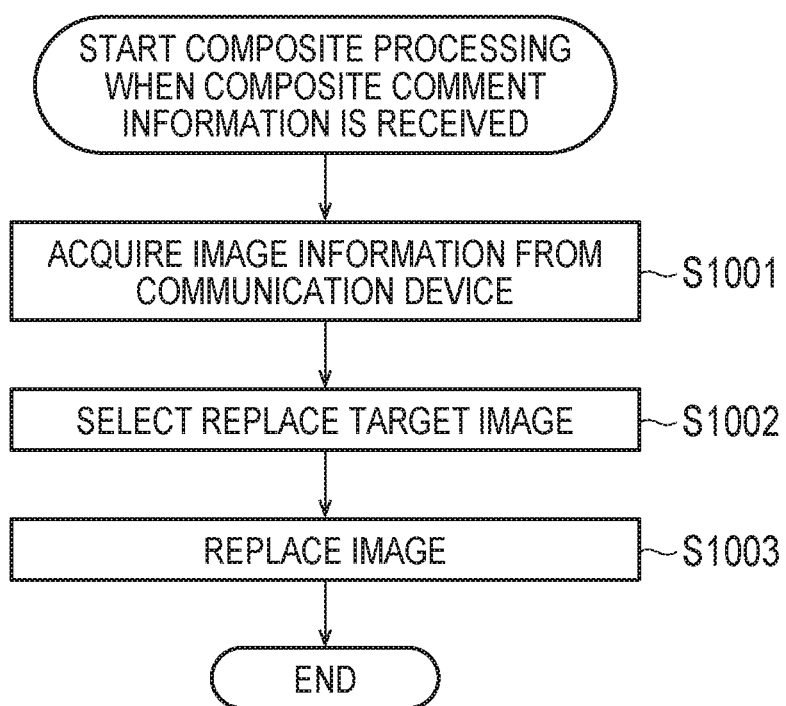
FIG. 30 is a flowchart showing an operation of composite processing in the server when image information to which a composite comment is added is received.

Next, an operation of updating the layout of the storyboard in the server 100 when the image information to which the composite comment is added is received will be described. FIG. 30 is a flowchart showing the operation of updating the layout of the storyboard in the server 100 when the image information to which the composite comment is added is received.

The data acquisition unit 120 in the control unit 102 of the server 100 acquires the new image information from the second communication device 300 via the communication unit 114 (step S1001).

Next, the display information generation unit 132 selects the replace target image (step S1002). Specifically, the display information generation unit 132 selects the image registration information the image ID of which matches the image ID received this time among the image registration information stored in the memory 104.

Next, the display information generation unit 132 replaces the selected image information with the image information received this time (step S1003). By such processing, the image information before the composite comment is composited is also stored and held in the first communication device 200 and the second communication device 300, and the composition can be easily canceled.

Figure 31:
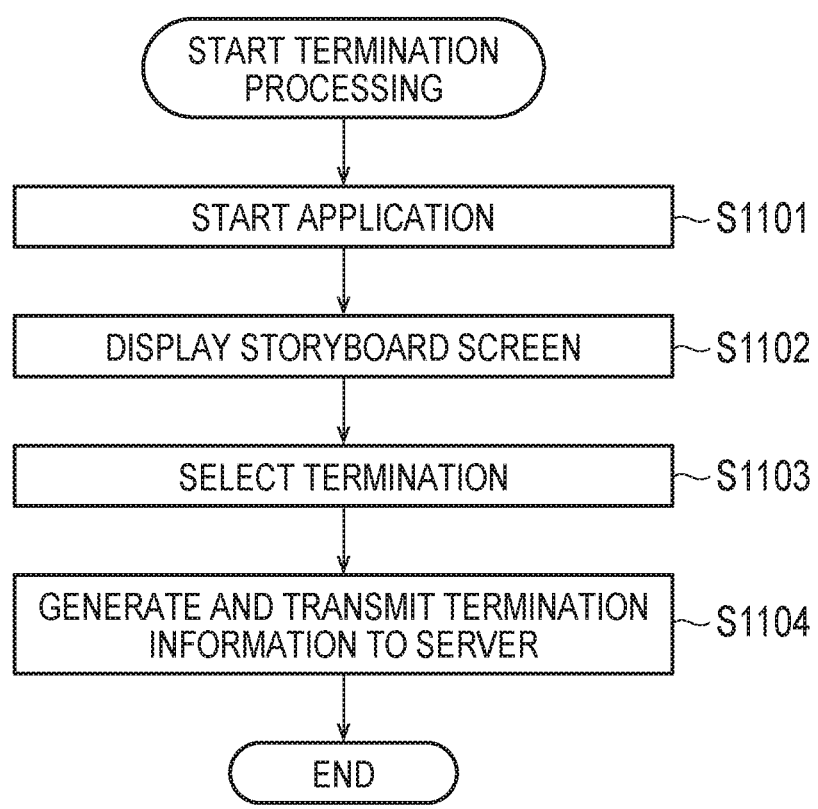
FIG. 31 is a flowchart showing an operation of termination processing in the first communication device and the second communication device.

Next, an operation of termination processing in the first communication device 200 and the second communication device 300 will be described. FIG. 31 is a flowchart showing the operation of termination processing in the first communication device 200 and the second communication device 300.

The control units 202 in the first communication device 200 and the second communication device 300 start the application program (application) for the storyboard according to a predetermined operation to the operation unit 206 by the user (step S1101). Then, the control unit 202 performs the control to display the storyboard screen on the display unit 207 according to a predetermined operation to the operation unit 206 by the user (step S1102).

The user of the second communication device 300 can select a termination button icon 636 while the storyboard screen 631 shown in FIG. 9 is being displayed. When the termination button icon 636 is selected, the control unit 202 selects the termination of the storyboard (step S1103). Furthermore, the control unit 202 generates termination information containing the corresponding storyboard ID, the user ID, and information indicating that the termination is selected (flag or the like), and transmits the termination information to the server 100 (step S1104).

Figure 32:
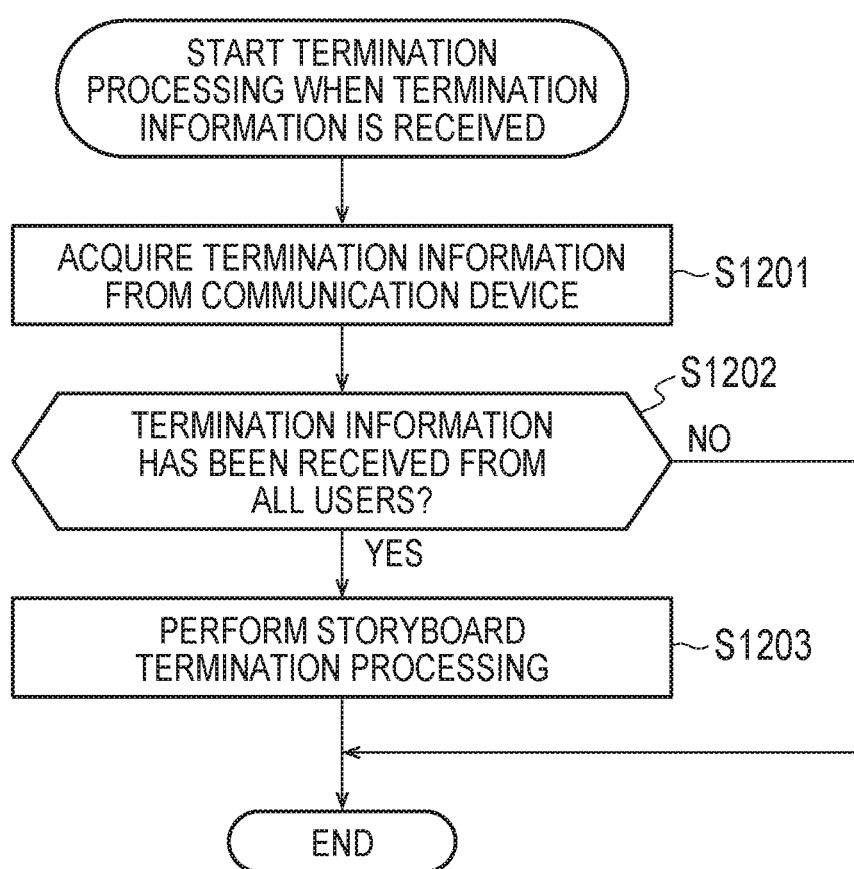
FIG. 32 is a flowchart showing an operation of termination processing in the server when termination information is received.

Next, an operation of termination processing in the server 100 when the termination information is received will be described. FIG. 32 is a flowchart showing the operation of termination processing in the server 100 when the termination information is received.

The data acquisition unit 120 in the control unit 102 of the server 100 acquires the termination information from the first communication device 200 and the second communication device 300 via the communication unit 114 (step S1201).

Next, the group determination unit 124 determines whether or not the termination information has been acquired from all the users participating in the event corresponding to the storyboard (step S1202). Specifically, the group determination unit 124 acquires, for each storyboard, the creation user ID in the corresponding storyboard information and the invited user ID to which the participation flag "1" is set. Furthermore, the group determination unit 124 compares all the acquired user IDs with the user IDs in all the acquired termination information. When all the acquired user IDs are included in the user IDs in all the acquired termination information, the group determination unit 124 determines that the termination information has been acquired from all the users participating in the event corresponding to the storyboard.

When the termination information has not been acquired from all the users participating in the storyboard (step S1202; NO), the series of operations is terminated. On the other hand, when the termination information has been acquired from all the users participating in the storyboard (step S1202; YES), the control unit 102 terminates various types of processing related to the corresponding storyboard. Furthermore, the control unit 102 transmits information indicating that the event corresponding to the storyboard has ended to the first communication device 200 and the second communication device 300 specified by the creation user ID and the invited user ID. In the storyboard screen, comments such as "See you" and "Thanks for participation" are added, and the display is switched to a display mode showing that the event corresponding to this storyboard has terminated (step S1203).

As described above, in the information management system 1 according to the present embodiment, when the image information is transmitted from the first communication device 200, the server 100 acquires the storyboard ID, the user ID, the photographing date/time, and the like contained in the image information. Furthermore, the server 100 compares the storyboard ID and the user ID with the storyboard ID and the user ID in the storyboard information, specifies the registration destination of the image registration information corresponding to the image information, and registers them. Furthermore, the server 100 generates the layout screen in which the images are displayed in chronological order based on the image registration information and the layout information. Thus, it is possible to vicariously experience the event schedule in chronological order afterward.

The server 100 divides the period from the start date/time to the end date/time of the event corresponding to the storyboard for each predetermined period, and arranges the images the photographing date/times of which are included in the predetermined period in the layout screen for each predetermined period. Furthermore, when there is no image the photographing date/time of which is included in the predetermined period, the server 100 displays only the information indicating the elapse of time in the layout screen. Thus, it is possible to easily grasp the elapse of time.

Furthermore, when transmitting the layout screen information to the second communication device 300 and receiving the evaluation information on the evaluation of the image from the second communication device 300, the server 100 updates the layout information based on the number of evaluations so as to increase the display size of the image having a large number of evaluations or the like, and generates a new layout screen. Thus, it possible to perform display according to the evaluation of the image.

Furthermore, the server 100 updates the layout information so as to increase the display size of the image including the face image, and generates a new layout screen. Thus, it is possible to make the image including the face image more noticeable.

Furthermore, when the layout screen includes a panoramic image or a dome view image, the server 100 adds, to the layout screen information, display control information for displaying a part of the panoramic image or the dome view image according the operation instruction of selecting the panoramic image or the dome view image by the user of the first communication device 200 or the like, or according to the display position of the panoramic image or the dome view image. Thus, it possible to easily switch images in the first communication device 200 or the like.

Figure 33:
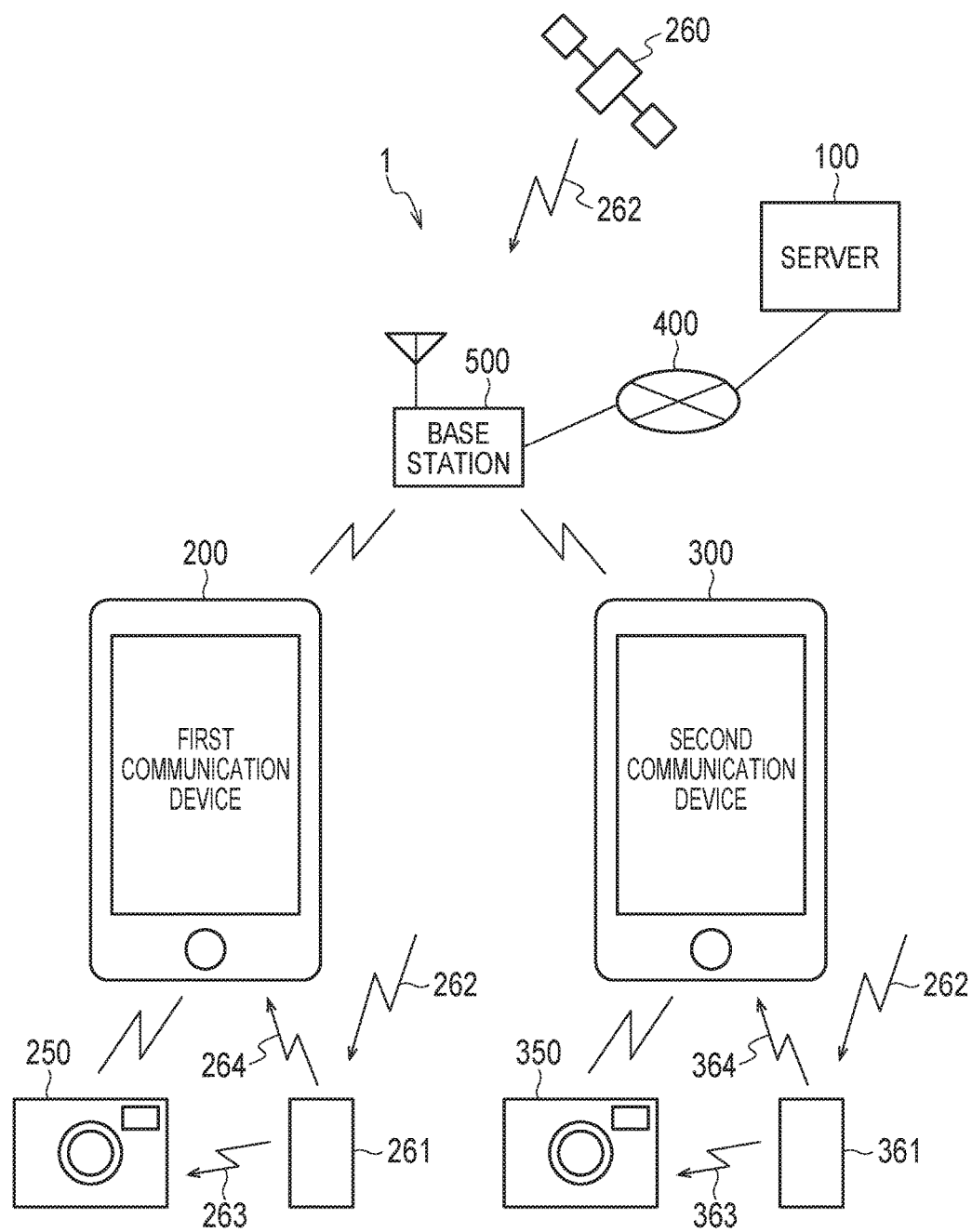
FIG. 33 is a diagram showing a configuration of an information management system according to a modified example of an embodiment of the present invention.

In the present embodiment, the method for acquiring photographing location information on image data added to the image information has not been described in detail, but the photographing location information can be acquired by using the information management system 1 as a modified example as shown in FIG. 33. In FIG. 33, the information management system 1 further includes small wireless communication devices 261 and 361, and may cause the wireless communication devices 261 and 361 to receive positioning data 262 transmitted from an artificial satellite 260, and transmit self-position information 264 and 364 based on the received positioning data 262 to the first communication device 200 and the second communication device 300 to acquire the photographing location information. In this case, by transmitting photographing (recording) instruction signals 263 and 363 from the wireless communication devices 261 and 361 to the digital cameras 250 and 350, it is possible to store the self-position information corresponding to the image data of the photographed image as the photographing location associated with image information.

Furthermore, in the present embodiment, the user (event participant) who has uploaded the image is not known from the image registration information stored in the memory 104. However, in the modification example shown in FIG. 34, the user ID of the user who has uploaded the image information may be stored and managed in association with the image ID. Thus, it is possible for the server 100 to specify the user (event participant) who has uploaded the image information. Accordingly, by including who is the uploading user in the evaluation target in step S703 of the flowchart of FIG. 26 for updating the layout screen in addition to the number of evaluations, it is possible to resolve a sense of unfairness such as an increase in the rate of displaying the images photographed by a certain user (event participant) in the layout screen. Furthermore, since the user IDs of the first communication device 200 and the second communication device 300 to which the storyboard screen and the layout screen are transmitted can be specified in the server 100, it is possible to display a different layout screen for each user of the communication device of the transmission destination if the storyboard screen is the same, or to display the images uploaded by each user so as to be distinguishable in the layout screen.

Figure 35:
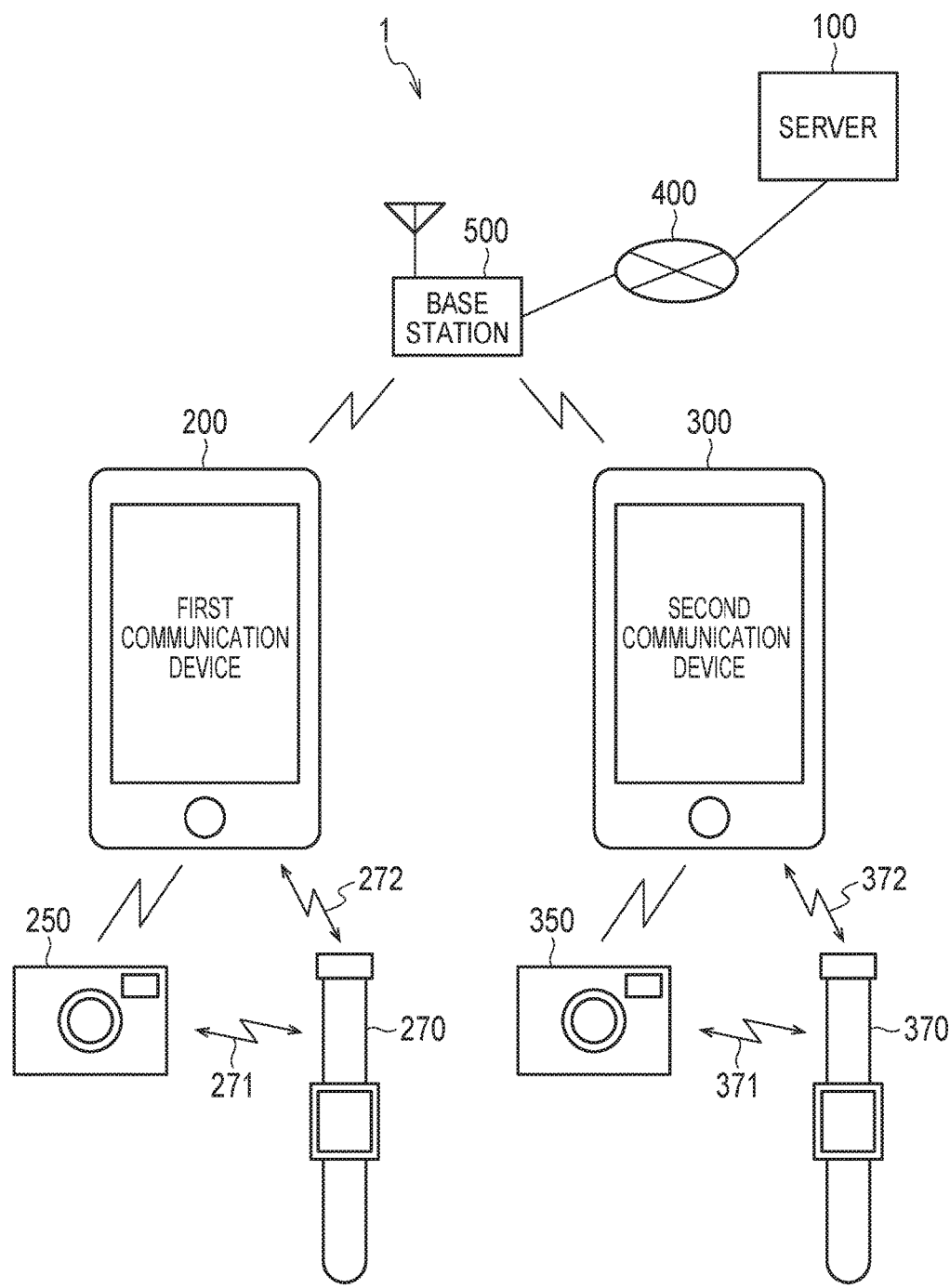
FIG. 35 is a diagram showing a configuration of an information management system according to another modified example of an embodiment of the present invention.

As the information to be added to the image information, biological information of a user may be added. FIGS. 35 and 36 show a modified example exemplifying this case. In FIG. 35, the information management system 1 shown in FIG. 1 further includes wristwatch type devices 270 and 370 which can be mounted on a user's body and acquire the biological information of the user as sensor data. The wristwatch type devices 270 and 370 acquire biological information (quantity of motion such as heart rate (pulse), body temperature, number of steps, and the like) of the user mounting the device as sensor data, and transmit sensor data 272 and 372 to the first communication device 200 and the second communication device 300. Furthermore, by transmitting photographing (recording) instruction signals 271 and 371 from the wireless communication devices 261 and 361 to the digital cameras 250 and 350 by the wristwatch type devices 270 and 370, it is possible to store the sensor data corresponding to the image data of the photographed image as the biological information associated with the image information. When the first communication device 200 (the second communication device 300) transmits the image information acquired in this manner to the server 100, the image information is recorded in the image registration information as shown in FIG. 36. By storing and managing the information in this manner, and by including the condition of the body, emotion, state of mind of the user who has uploaded the image analyzed from the sensor data in the evaluation target in step S703 of the flowchart of FIG. 26 for updating the layout screen in addition to the number of evaluations, it is possible to increase the rate of displaying the image of the moving exiting scenes in the layout screen.

Note that, the present invention is not limited to the above embodiment, and can be variously modified and applied. For example, in the above embodiment, the operations of FIGS. 4, 10, 11, 13, 24, and 28 has been described so as to be performed by either of the first communication device 200 or the second communication device 300, but the other may perform the operation.

Furthermore, the screen of FIG. 5 and the like are merely examples, and the layout may be different, or a part of the screen may be appropriately omitted.

Moreover, it has been described that the first communication device 200 and the second communication device 300 as the display devices are smart phones, but other devices may be used. For example, it may be a personal computer, a personal handy-phone system (PHS), a personal digital assistant or personal data assistance (PDA), a tablet personal computer (PC), a game device, a portable music reproducing device, or the like.

Alternatively, by preparing a device having both the functions of the first communication device 200 and the second communication device 300, and the server 100, both the functions may be selectively used according to the situation.

In each embodiment, by storing a program to be executed in a computer readable recording medium such as a flexible disk, a compact disc-read only memory (CD-ROM), a digital versatile disc (DVD), a magneto-optical disc (MO), distributing the medium, and installing the program, the system which performs the above processing may be implemented.

Alternatively, the program may be stored in a disk device or the like of a predetermined server on a network NW such as the internet, and downloaded by, for example, superimposing the program on a carrier wave.

Note that, when the above functions are shared and implemented by the operating system (OS) or when the above functions are implemented by the cooperation of the OS and the application, the portion other than the OS may be stored in the medium and distributed, or may be downloaded.

The preferred embodiment of the present invention has been described above, but the present invention is not limited to the specific embodiment, and includes the inventions described in the claims and the equivalent scope thereof.

What is claimed is:

1. A display information generating device comprising:
a data acquisition unit configured to acquire data transmitted from outside of the display information generating device;
an information acquisition unit configured to acquire information on a generated date-and-time of the data acquired by the data acquisition unit;
a sender specifying unit configured to specify a sender of the data acquired by the data acquisition unit;
a first determination unit configured to determine whether or not the sender specified by the sender specifying unit belongs to a preset group;
a control unit configured to, when the first determination unit determines that the sender belongs to the group, associate identification information for identifying the group with the data acquired by the data acquisition unit; and
a generation unit configured to, if the identification information is associated with a plurality of pieces of data by the control unit, generate display information in which the plurality of pieces of data is arranged in a chronological order based on the generated date-and-time of the data acquired by the information acquisition unit.

2. The display information generating device according to claim 1, further comprising:
a second determination unit configured to determine whether or not the generated date-and-time of the data is within a predetermined period, wherein
the group is associated with information for specifying the sender and the predetermined period; and
the generation unit is configured to arrange, in the display information, the data the generation date-and-time of which is determined to be within the predetermined period by the second determination unit.

3. The display information generating device according to claim 2, further comprising:

a division unit configured to divide the predetermined period into a plurality of unit time periods; and
a third determination unit configured to determine whether or not there is the data the generation date-and-time of which is within each unit time period into which the predetermined period is divided by the division unit, wherein
when the third determination unit determines that there is a period in which there is no data, the generation unit is configured to generate the display information by replacing the period in which there is no data with the display information indicating elapse of time.

4. The display information generating device according to claim 1, further comprising:
a transmission unit configured to transmit the display information generated by the generation unit to a display device of the sender belonging to the group; and
a reception unit configured to receive evaluation information, which is transmitted from the display device, on the data in the display information, wherein
the generation unit is further configured to generate the display information in which the plurality of pieces of data is arranged according to the evaluation information.

5. The display information generating device according to claim 4, wherein
the data is an image; and
the generation unit is configured to generate the display information in which display sizes of a plurality of images are changed and the plurality of images is arranged according to the evaluation information.

6. The display information generating device according to claim 4, further comprising:
a fourth determination unit configured to determine whether or not a face image is included in an image, the data being the image; and
an evaluation control unit configured to raise evaluation of the image determined to include the face image by the fourth determination unit, wherein
the generation unit is further configured to generate the display information in which a plurality of images is arranged based on an evaluation result by the evaluation control unit.

7. The display information generating device according to claim 5, wherein
the image includes a wide angle image having a size exceeding a display range of the display device; and
the display information generated by the generation unit includes first display control information for displaying an image which is apart of the wide angle image, and second display control information for displaying the entire wide angle image by scrolling.

8. The display information generating device according to claim 7, wherein
the display information includes third display control information for alternately switching display based on the first display control information and display based on the second display control information according to detection of an instruction to the image being displayed.

9. The display information generating device according to claim 7, wherein
the display information includes fourth display control information for alternately switching display based on the first display control information and display based on the second display control information according to detection of a display position of the image being displayed.

10. The display information generating device according to claim 5, wherein
the image is photographed by an external photographing apparatus and transmitted via a predetermined wireless communication medium.

11. An information management system comprising:
a display information generating device; and
a display device, wherein
the display information generating device comprises:
   a data acquisition unit configured to acquire data transmitted from outside of the display information generating device;
   an information acquisition unit configured to acquire information on a generated date-and-time of the data acquired by the data acquisition unit;
   a sender specifying unit configured to specify a sender of the data acquired by the data acquisition unit;
   a first determination unit configured to determine whether or not the sender specified by the sender specifying unit belongs to a preset group;
   a control unit configured to, when the first determination unit determines that the sender belongs to the group, associate identification information for identifying the group with the data acquired by the data acquisition unit;
   a generation unit configured to, if the identification information is associated with a plurality of pieces of data by the control unit, generate display information in which the plurality of pieces of data is arranged in a chronological order based on the generated date-and-time of the data acquired by the information acquisition unit; and
   a transmission unit configured to transmit the display information generated by the generation unit to the display device; and
the display device comprises:
   a reception unit configured to receive the display information transmitted from the transmission unit; and
   a display control unit configured to display the display information received by the reception unit.

12. The information management system according to claim 11, wherein
the display information generating device further comprises a second determination unit configured to determine whether or not the generated date-and-time of the data is within a predetermined period;
the group is associated with information for specifying the sender and the predetermined period; and
the generation unit is configured to arrange, in the display information, the data the generation date-and-time of which is determined to be within the predetermined period by the second determination unit.

13. The information management system according to claim 12, wherein
the display information generating device further comprises:
   a division unit configured to divide the predetermined period into a plurality of unit time periods; and
   a third determination unit configured to determine whether or not there is the data the generation date-and-time of which is within each unit time period into which the predetermined period is divided by the division unit; and when the third determination unit determines that there is a period in which there is no data, the generation unit is configured to generate the display information by replacing the period in which there is no data with the display information indicating elapse of time.

14. The information management system according to claim 11, wherein
the display information generating device further comprises:
   a transmission unit configured to transmit the display information generated by the generation unit to a display device belonging to the group; and
   a reception unit configured to receive evaluation information, which is transmitted from the display device, on the data in the display information, and
the generation unit is further configured to generate the display information in which the plurality of pieces of data is arranged according to the evaluation information.

15. The information management system according to claim 14, wherein
the data is an image; and
the generation unit is configured to generate the display information in which display sizes of a plurality of images are changed and the plurality of images is arranged according to the evaluation information.

16. The information management system according to claim 14, wherein
the display information generating device further comprises:
   a fourth determination unit configured to determine whether or not a face image is included in an image, the data being the image; and
   an evaluation control unit configured to raise evaluation of the image determined to include the face image by the fourth determination unit, wherein
the generation unit is further configured to generate the display information in which a plurality of images is arranged based on an evaluation result by the evaluation control unit.

17. The information management system according to claim 15, wherein
the image includes a wide angle image having a size exceeding a display range of the display device; and
the display information generated by the generation unit includes first display control information for displaying an image which is apart of the wide angle image, and second display control information for displaying the entire wide angle image by scrolling.

18. The information management system according to claim 17, wherein
the display information includes third display control information for alternately switching display based on the first display control information and display based on the second display control information according to detection of an instruction to the image being displayed.

19. The information management system according to claim 17, wherein
the display information includes fourth display control information for alternately switching display based on the first display control information and display based on the second display control information according to detection of a display position of the image being displayed.

20. The information management system according to claim 15, wherein the image is photographed by an external photographing apparatus and transmitted via a predetermined wireless communication medium.

21. A display information generating method comprising:

a data acquisition step of acquiring data transmitted from outside;

an information acquisition step of acquiring information on a generated date-and-time of the data acquired in the data acquisition step;

a sender specifying step of specifying a sender of the data acquired in the data acquisition step;

a determination step of determining whether or not the sender specified in the sender specifying step belongs to a preset group;

a control step of, when it is determined that the sender belongs to the group in the sender specifying step, associating identification information for identifying the group with the data acquired in the data acquisition step; and a generation step of, if the identification information is associated with a plurality of pieces of data in the control step, generating display information in which the plurality of pieces of data is arranged in a chronological order based on the generated date-and-time of the data acquired in the information acquisition step.

22. A non-transitory recording medium storing a computer readable program for causing a computer to function as: a data acquisition unit configured to acquire data transmitted from outside of the computer; an information acquisition unit configured to acquire information on a generated date-and-time of the data acquired by the data acquisition unit; a sender specifying unit configured to specify a sender of the data acquired by the data acquisition unit; a determination unit configured to determine whether or not the sender specified by the sender specifying unit belongs to a preset group; a control unit configured to, when the determination unit determines that the sender belongs to the group, associate identification information for identifying the group with the data acquired by the data acquisition unit; and a generation unit configured to, if the identification information is associated with a plurality of pieces of data by the control unit, generate display information in which the plurality of pieces of data is arranged in a chronological order based on the generated date-and-time of the data acquired by the information acquisition unit.

* * * * *